(12) United States Patent
Aoki et al.

(10) Patent No.: US 7,406,198 B2
(45) Date of Patent: Jul. 29, 2008

(54) IMAGE CAPTURE APPARATUS

(75) Inventors: Takahiro Aoki, Kawasaki (JP); Toshio Endoh, Kawasaki (JP); Mitsuaki Fukuda, Kawasaki (JP); Masaki Watanabe, Kawasaki (JP); Takayuki Sugiura, Kato (JP); Naoyuki Fujimoto, Kato (JP); Kiyoshi Chinzei, Ono (JP); Mieko Nakano, Kato (JP); Satoshi Fukui, Kato (JP); Atsushi Miki, Kato (JP); Shuji Kimura, Kato (JP); Mitsuhiro Gotoh, Kato (JP); Makoto Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 10/763,423

(22) Filed: Jan. 26, 2004

(65) Prior Publication Data
US 2004/0208373 A1 Oct. 21, 2004

(30) Foreign Application Priority Data
Mar. 25, 2003 (JP) ............................. 2003-083927

(51) Int. Cl.
*G06K 9/68* (2006.01)
(52) U.S. Cl. ..................... 382/218; 382/209; 382/219
(58) Field of Classification Search ................. 382/209, 382/218, 219; 283/91
See application file for complete search history.

(56) References Cited

U.S. PATENT DOCUMENTS

| 5,686,210 | A | * | 11/1997 | Sharman | ..................... | 430/30 |
| 5,751,446 | A | * | 5/1998 | Fujioka | ....................... | 358/474 |
| 6,029,015 | A | * | 2/2000 | Ishiguro | ..................... | 396/187 |
| 6,583,813 | B1 | * | 6/2003 | Enright et al. | .............. | 348/150 |
| 6,845,178 | B1 | * | 1/2005 | Evans et al. | ................. | 382/216 |
| 2003/0051255 | A1 | * | 3/2003 | Bulman et al. | .............. | 725/135 |

FOREIGN PATENT DOCUMENTS

| JP | 05-246184 A | 9/1993 |
| JP | 06-018230 A | 1/1994 |
| JP | 06-034442 A | 2/1994 |
| JP | 06-236452 A | 8/1994 |
| JP | 06-316842 A | 11/1994 |
| JP | 06-325271 A | 11/1994 |

(Continued)

OTHER PUBLICATIONS

Takagi, M. et al., "Handbook of Image Analysis", ISBN 4-13-061107-0 pp. 707-746; partial English translation.

(Continued)

*Primary Examiner*—Matthew C. Bella
*Assistant Examiner*—Gregory F Cunningham
(74) *Attorney, Agent, or Firm*—Westerman, Hattori, Daniels & Adrian, LLP.

(57) ABSTRACT

An image capture apparatus is placed on a desk and an object to be captured is presented above the apparatus. An illumination device can emit light of a plurality of wavelengths, and a camera captures an image of an object to be captured using different wavelengths. By processing an image using different wavelengths, the material of the object to be captured can be obtained. The captured image is compared with a recorded image stored in the image capture apparatus and used in image determination.

19 Claims, 25 Drawing Sheets

FOREIGN PATENT DOCUMENTS

| | | |
|---|---|---|
| JP | 07-23868 B2 | 3/1995 |
| JP | 07-128133 A | 5/1995 |
| JP | 07-140209 A | 6/1995 |
| JP | 07-307301 A | 11/1995 |
| JP | 08-075828 A | 3/1996 |
| JP | 08-178936 A | 7/1996 |
| JP | 08-181728 A | 7/1996 |
| JP | 08-242459 A | 9/1996 |
| JP | 09-054850 A | 2/1997 |
| JP | 09-058341 A | 3/1997 |
| JP | 09-061351 A | 3/1997 |
| JP | 09-288007 A | 11/1997 |
| JP | 09-318329 A | 12/1997 |
| JP | 10-021442 A | 1/1998 |
| JP | 10-143705 A | 5/1998 |
| JP | 10-232284 A | 9/1998 |
| JP | 10-254124 A | 9/1998 |
| JP | 10-260014 A | 9/1998 |
| JP | 10-289304 A | 10/1998 |
| JP | 28-66016 B2 | 12/1998 |
| JP | 11-037799 A | 2/1999 |
| JP | 11-085257 A | 3/1999 |
| JP | 11-151637 A | 6/1999 |
| JP | 11-203452 A | 7/1999 |
| JP | 11-211612 A | 8/1999 |
| JP | 2000-065804 A | 3/2000 |
| JP | 2000-131243 A | 5/2000 |
| JP | 2000-137774 A | 5/2000 |
| JP | 2000-148887 A | 5/2000 |
| JP | 2000-356907 A | 12/2000 |
| JP | 2001-004452 A | 1/2001 |
| JP | 2001-076325 A | 3/2001 |
| JP | 2001-091223 A | 4/2001 |
| JP | 32-20955 B2 | 8/2001 |
| JP | 2001-228081 A | 8/2001 |
| JP | 2002-150349 A | 5/2002 |
| JP | 2002-245511 A | 8/2002 |
| JP | 2002-313859 A | 10/2002 |
| JP | 2002-342752 A | 11/2002 |
| JP | 2003-045800 A | 2/2003 |

OTHER PUBLICATIONS

Notice of Rejection Grounds for Corresponding Japanese Patent Application No. 2003-083927 mailed Sep. 27, 2005.
Notice of Rejection Grounds for Corresponding Japanese Patent Application No. 2003-083927 mailed Mar. 7, 2006.
Notice of Rejection Grounds for Corresponding Japanese Patent Application No. 2003-083927 mailed Aug. 29, 2006.

* cited by examiner

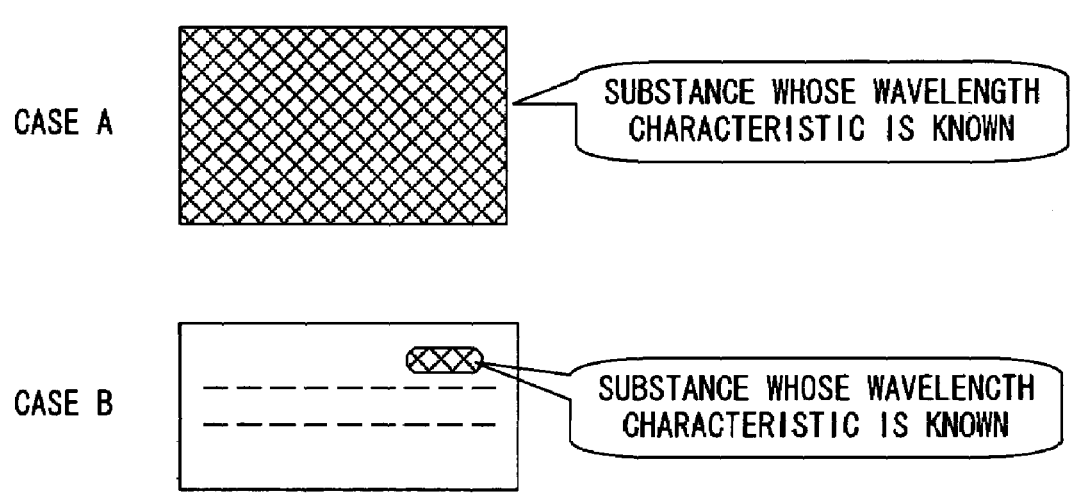
F I G. 4

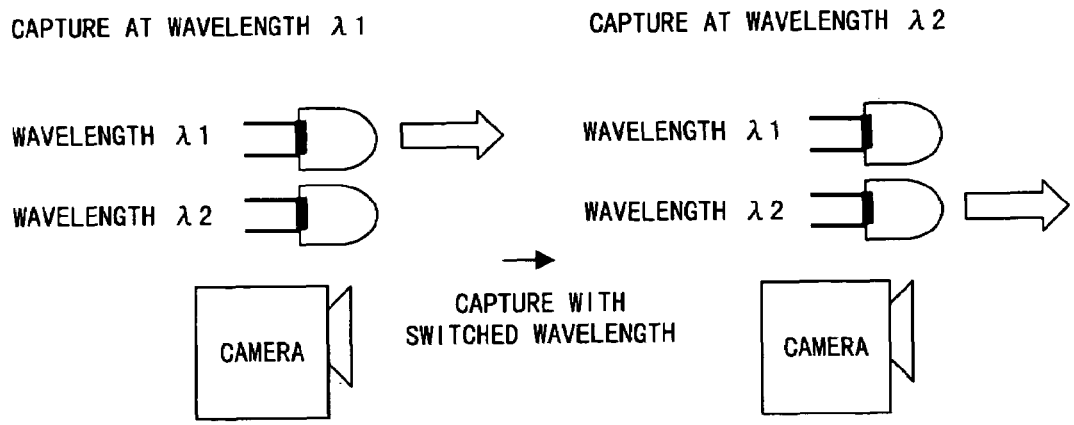
F I G. 5A
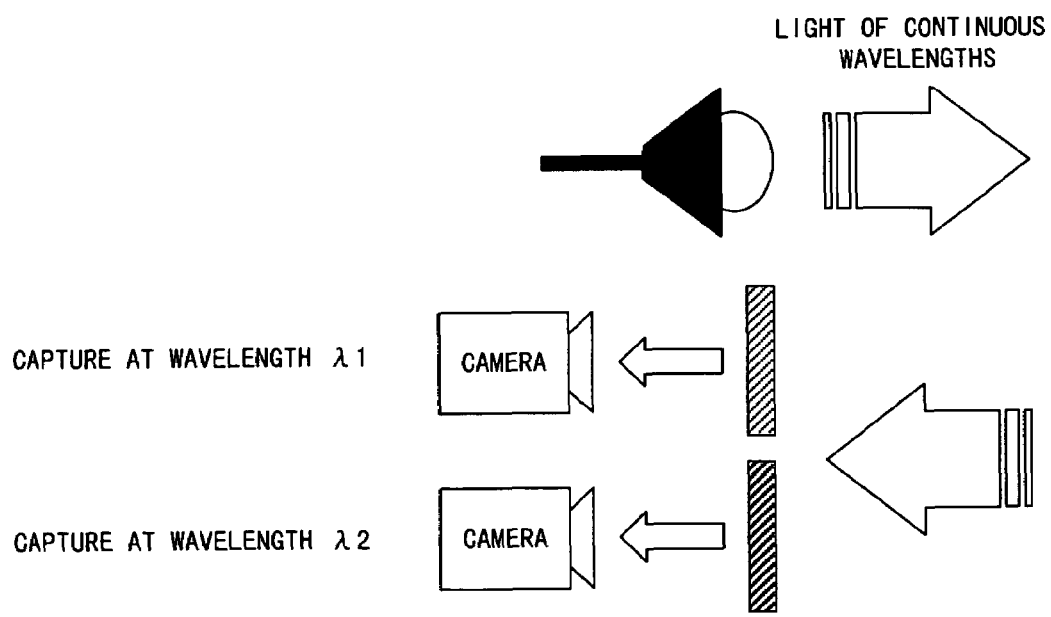
F I G. 5B

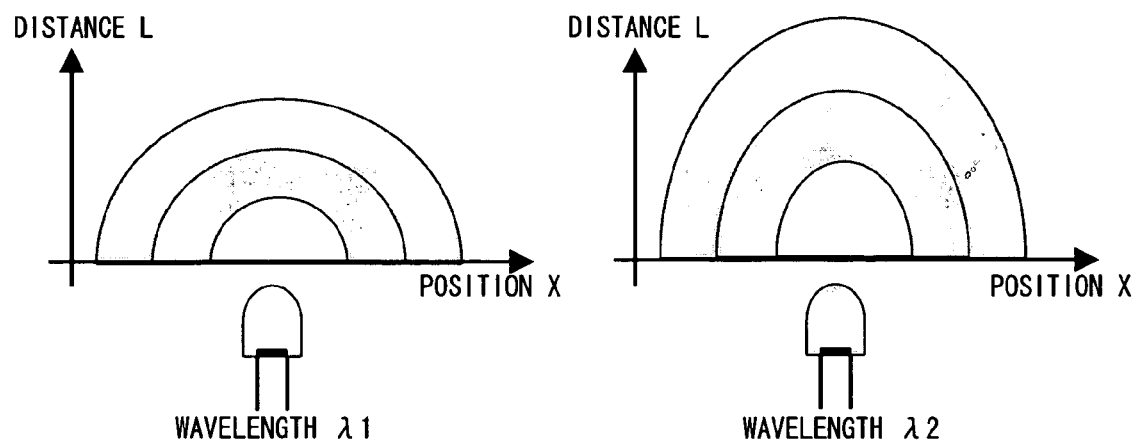
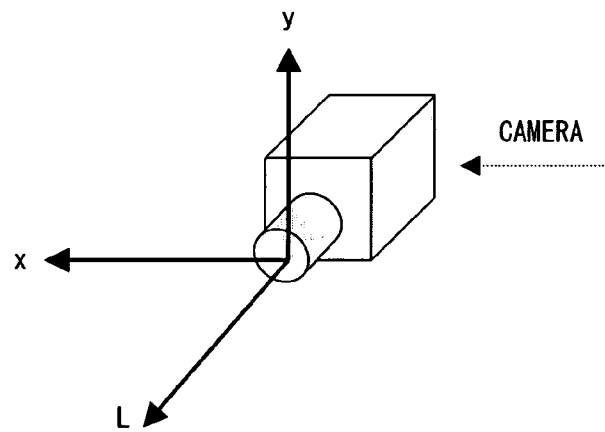
FIG. 6

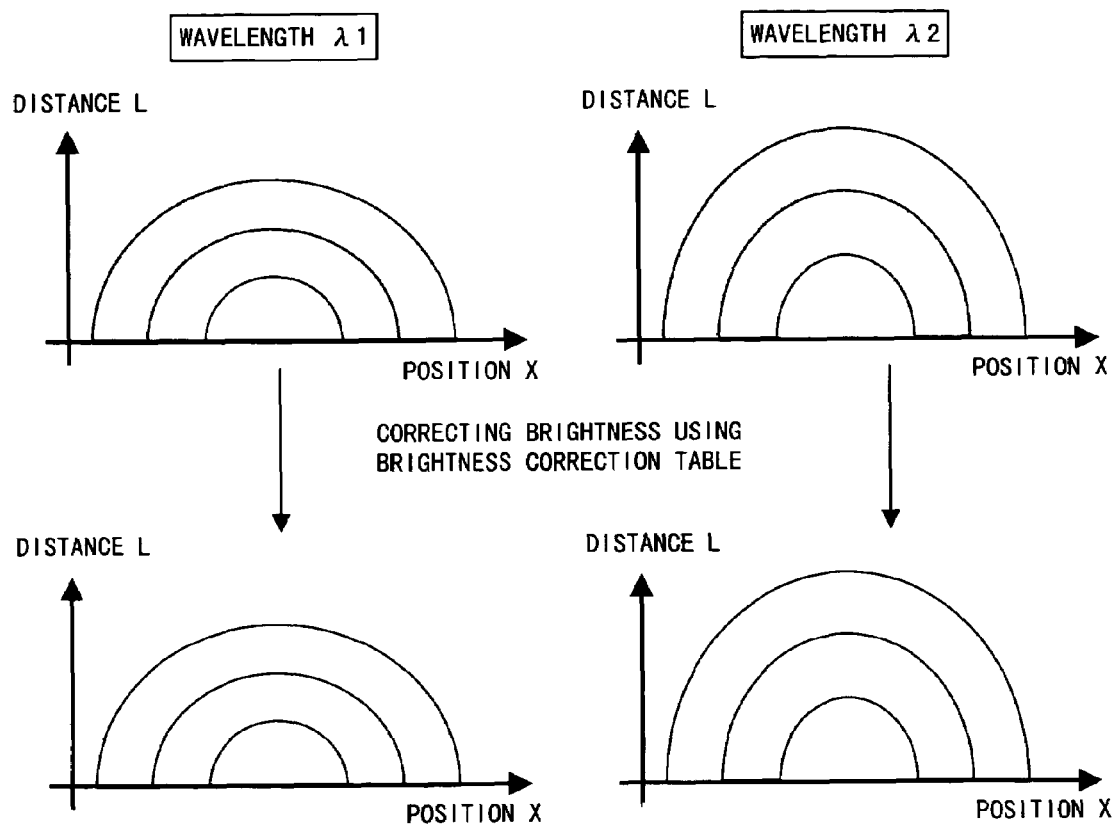
F I G. 8

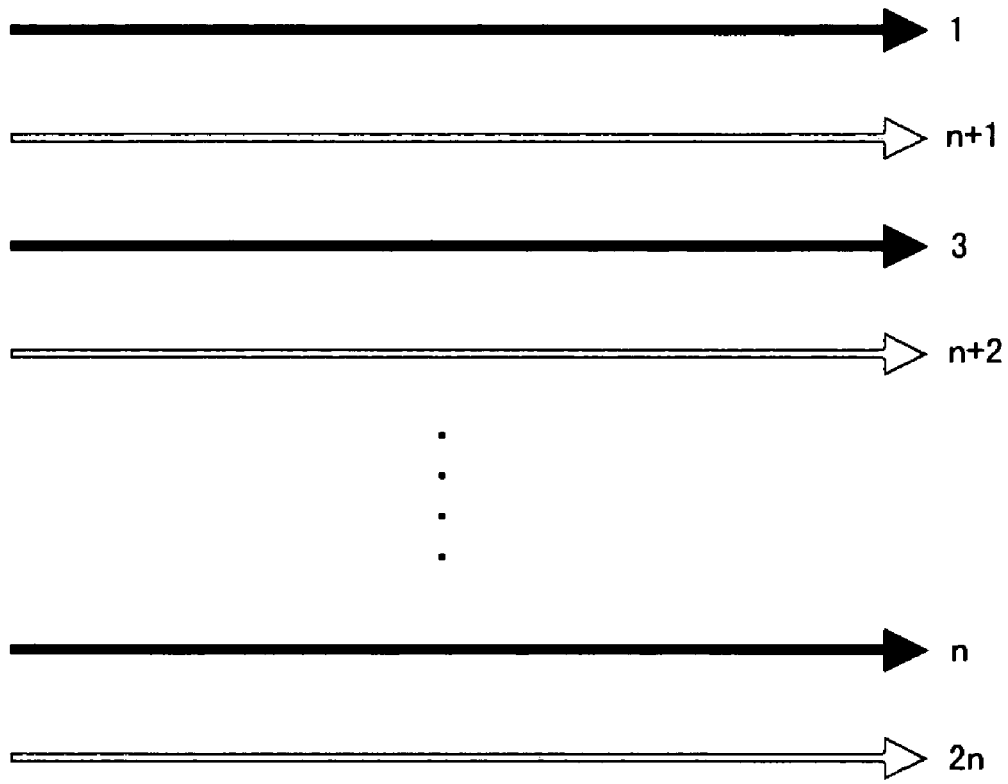
F I G. 1 1

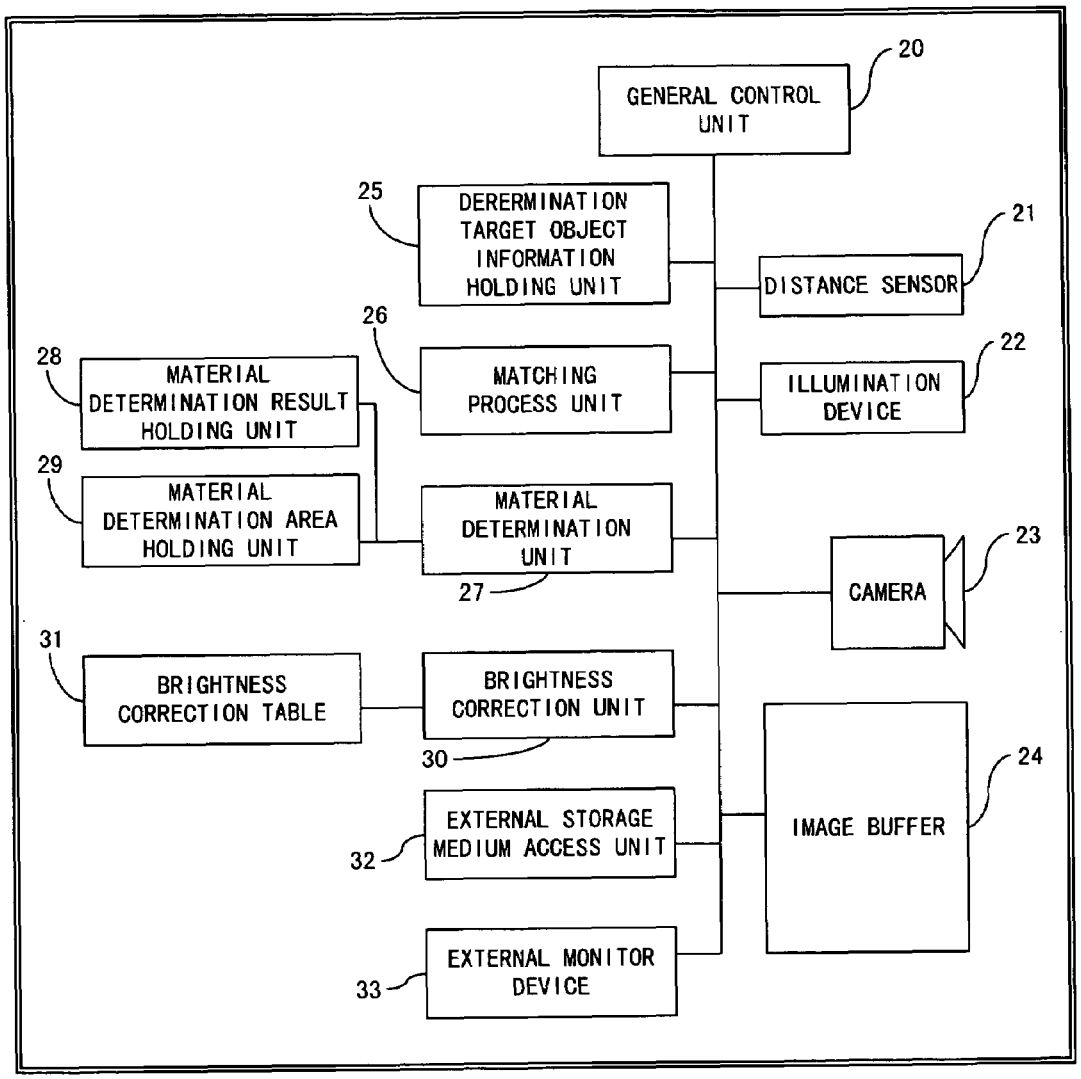
F I G. 1 5

| No | TIME | ID |
|---|---|---|
| 1 | ×× : ×× | 1058 |
| 2 | ×× : ×× | 1058 |
| 3 | ×× : ×× | 1058 |
| 4 | ×× : ×× | 1058 |
| 5 | ×× : ×× | 1058 |
| 6 | ×× : ×× | 1058 |

FIG. 18

DISTANCE TO OBJECT = TABLE FOR 5 cm

| RELATIVE DISTANCE L FROM CENTER | WAVELENGTH $\lambda 1$ | WAVELENGTH $\lambda 2$ |
|---|---|---|
| 0.0 | 1.2 | 2.0 |
| 0.2 | 1.5 | 4.0 |
| 0.4 | 2.0 | 5.1 |
| 0.6 | 3.1 | 6.3 |
| 0.8 | 4.1 | 8.0 |
| 0.8 | 4.9 | 9.4 |

F I G.   1 9 A

F I G.   1 9 B

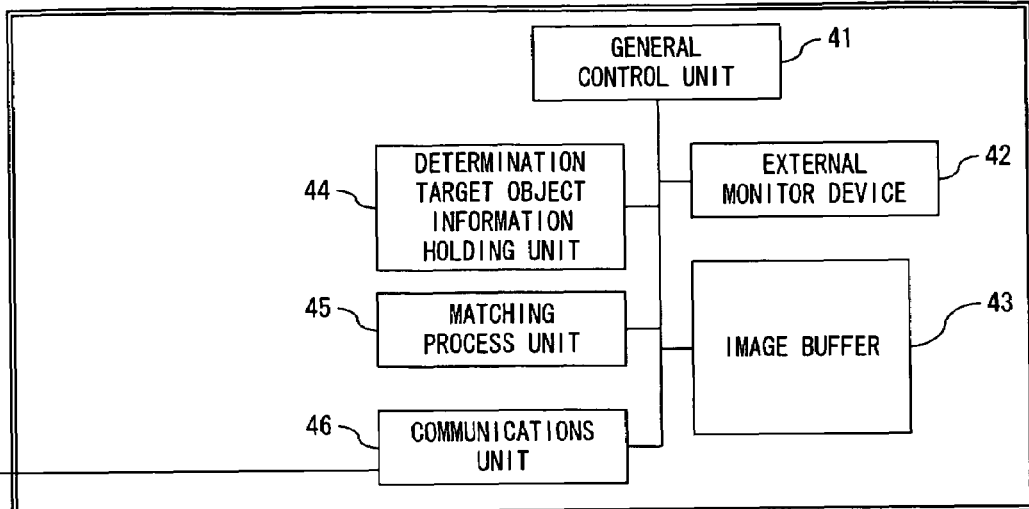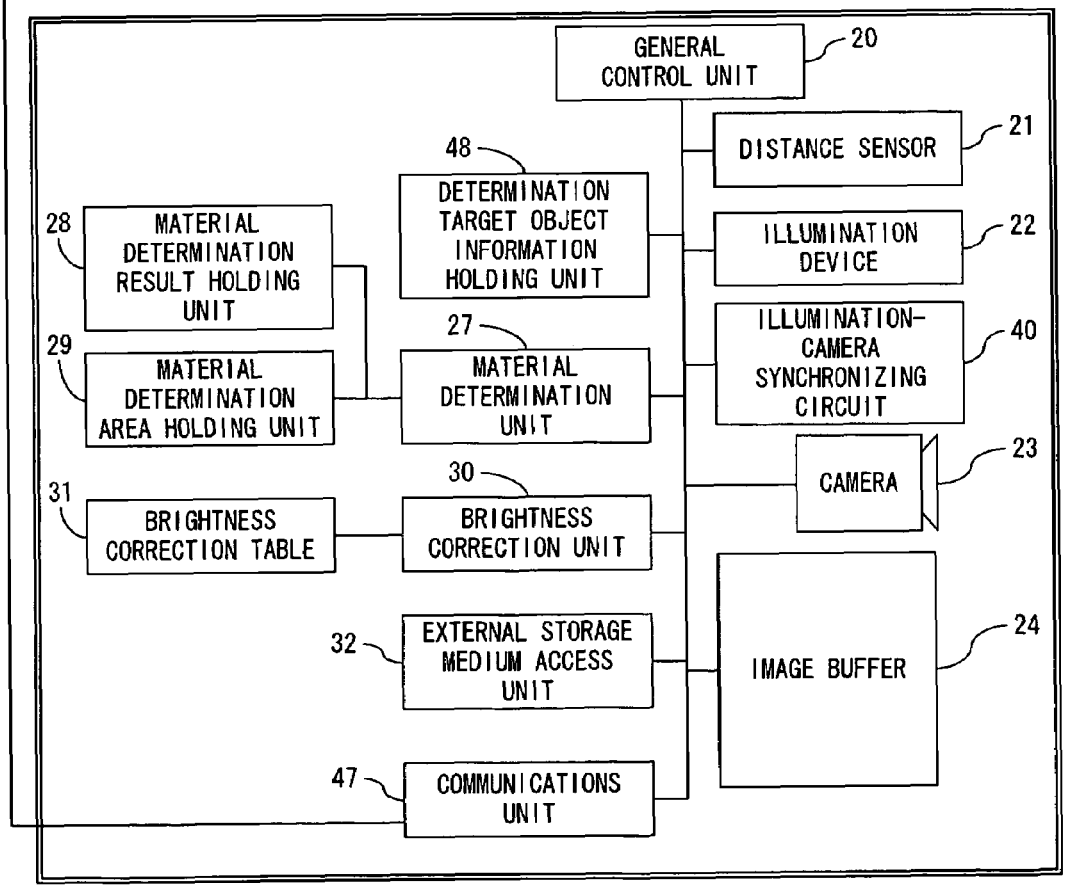
FIG. 20

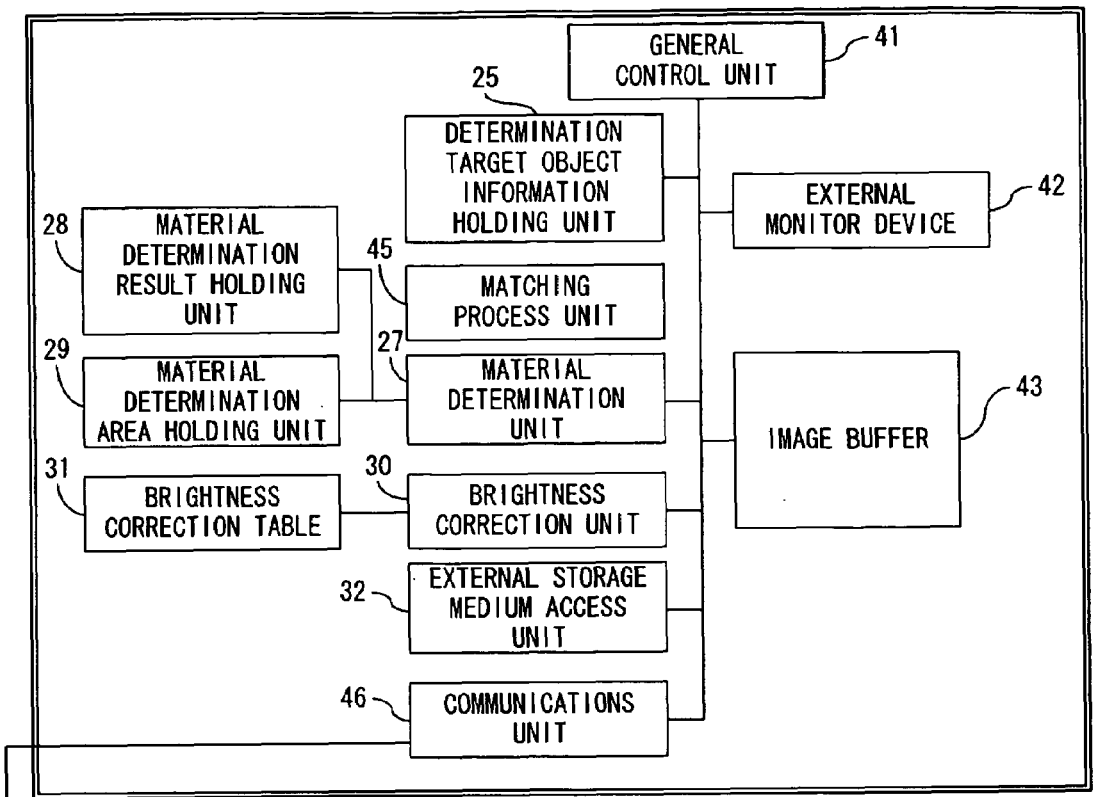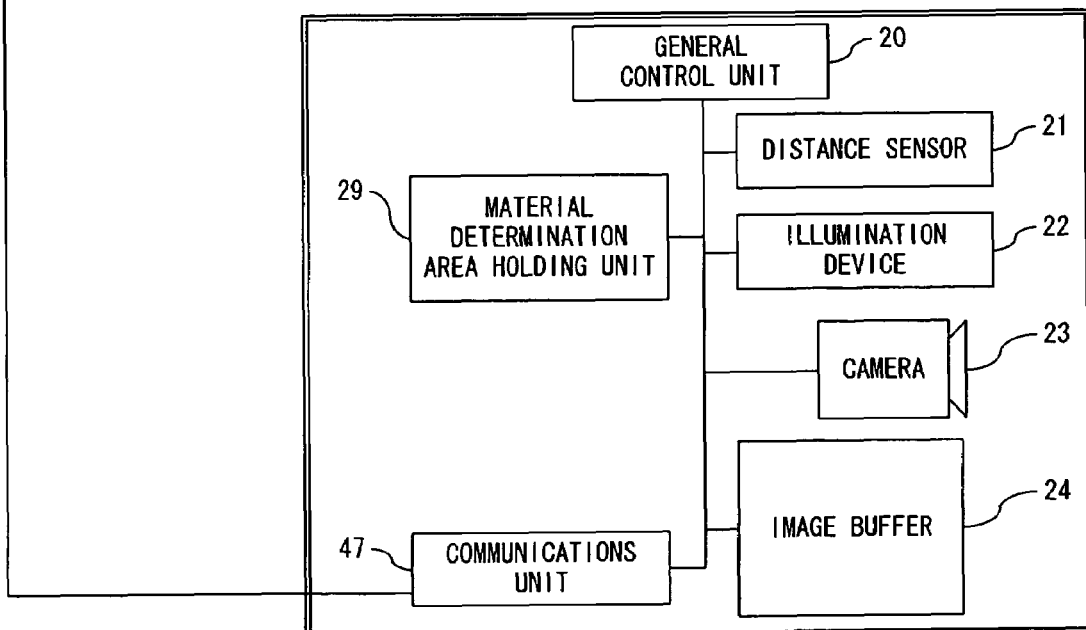
F I G. 2 2

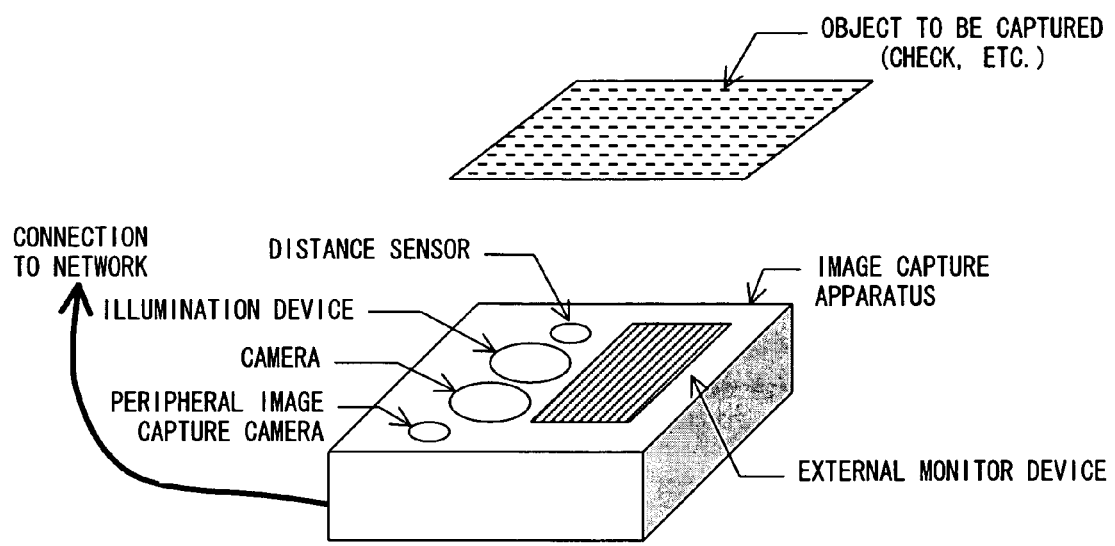
F I G. 2 5

IMAGE CAPTURE APPARATUS

BACKGROUND OF THE INVENTION

1. Field of the Invention

The present invention relates to an apparatus for capturing an object using a plurality of wavelengths without contact.

2. Description of the Related Art

FIG. 1 shows the difference in reflectance of light depending on the type of substance. The reflection of light depends on the specific property of a substance to which the light is applied. FIG. 1 shows an example. In FIG. 1, each portion of a substance A and a substance B is picked up to show the properties to light. The horizontal axis indicates the wavelength of light applied to a target object. The vertical axis indicates the reflectance of light when the light is applied to each substance. The substances A and B are different in reflectance property to the wavelength of light. Therefore, for example, the wavelengths of A, B, C, and D shown in FIG. 1 are selected, and the values of the reflectances are compared, thereby determining the substances A and B.

An invention for determining a substance without contact has been disclosed by the patent document 1, etc. In this technology, light having a wavelength easily absorbed by water content or light having a wavelength hardly absorbed by water content is applied from a light source, and captured by a camera, thereby determining the water content.

A conventional image capture apparatus for reading a slip, etc. without contact is disclosed by the patent documents 2, 3, etc.

FIG. 2 shows the outline of a conventional image capture apparatus.

First, a base 10 on which a document 13 to be read is set is mounted. The base 10 is provided with a column 11, a column 11 is mounted at the upper portion of the column 11. The column 11 contains a read device. An image captured by the read device is transmitted to a PC 14, etc., and a process of reading a slip, a check, etc. is performed.

[Patent Document 1]
Japanese Patent Application Laid-open No. Hei 9-61351

[Patent Document 2]
Japanese Patent Application Laid-open No.2002-342752

[Patent Document 3]
Japanese Patent Application Laid-open No.2000-148887

A conventional image capture apparatus which processes a plurality of wavelengths has the structure of fixing a target object and capturing an image of the target object. However, there is the problem that the entire apparatus is large because it requires a base, etc. in the above-mentioned structure, and is hard to operate it. Additionally, since an image is captured after setting a target object on the base, it takes a long time to capture an image, and is not suitable for use in which a quick shooting is requested.

Furthermore, since a conventional read device for reading a slip, etc. also has a structure in which a document is fixed on a base, etc. as in the case above, it also has the same problem. There is another problem with the device that it has no unit for determining whether or not a slip, etc. being read has been authenticated.

SUMMARY OF THE INVENTION

The present invention aims at providing an image capture apparatus capable of quickly capturing a target object and determining whether or not the target object is an authenticated document, etc.

The image capture apparatus according to the present invention includes a camera for capturing image data of an object to be captured, illumination for illuminating the object to be captured using a plurality of wavelengths, a storage unit for storing a recorded image of an object to be captured, a comparison-determination unit for comparing the recorded image with the obtained image data of the object to be captured and determining whether or not the image and the data match each other, and a material determination unit for determining the material of the object to be captured from the image of the object to be captured which has been obtained using the plurality of wavelengths. With the configuration, the image data can be obtained by holding the object up above the camera and the illumination.

According to the present invention, an object is captured by holding the object up above the camera. Therefore, the object to be captured can be quickly captured. Additionally, since an image is obtained by illuminating an object to be captured using a plurality of wavelengths, the material of the object to be captured can be known from the brightness. Thus, it is possible to determine whether the object to be captured is an expected and correct object to be captured or a wrong object. By providing a unit for comparing an image with a recorded image, a determination can be made whether the object to be captured is a correct object to be captured or a wrong object.

BRIEF DESCRIPTION OF THE DRAWINGS

FIG. 4 is an explanatory view of a falsification avoiding capability using a material determining capability based on an embodiment of the present invention;

FIGS. 5A and 5B are explanatory views showing two methods of capturing an image having a plurality of wavelengths;

FIG. 6 is an explanatory view showing the problem with the case in which different wavelengths of light are applied to an object to be captured;

FIG. 8 is an explanatory view showing the method of correcting the difference in brightness by a wavelength using a brightness correction table;

FIG. 11 is an explanatory view showing a method of storing data of an image obtained by applying different wavelengths;

FIG. 15 shows the first example of the configuration according to an embodiment of the present invention;

FIG. 18 shows an example of the information stored in a material determination result holding unit;

FIG. 20 shows the second example of the configuration of the image capture apparatus according to an embodiment of the present invention;

FIG. 22 shows the third example of the configuration of the image capture apparatus according to an embodiment of the present invention;

FIG. 25 shows the appearance of the fourth example of the configuration.

DESCRIPTION OF THE PREFERRED EMBODIMENTS

The image capture apparatus according to an embodiment of the present invention is characterized by the capability of determining the material of a target object by checking the unique wavelength characteristic after capturing an image using (1) an image matching capability and (2) a plurality of wavelengths. By using the above-mentioned capabilities, the apparatus can be used as a check reading device and a counterfeit bill determination device having a falsification avoiding capability based on the determination of the material of an object.

Figure 1:
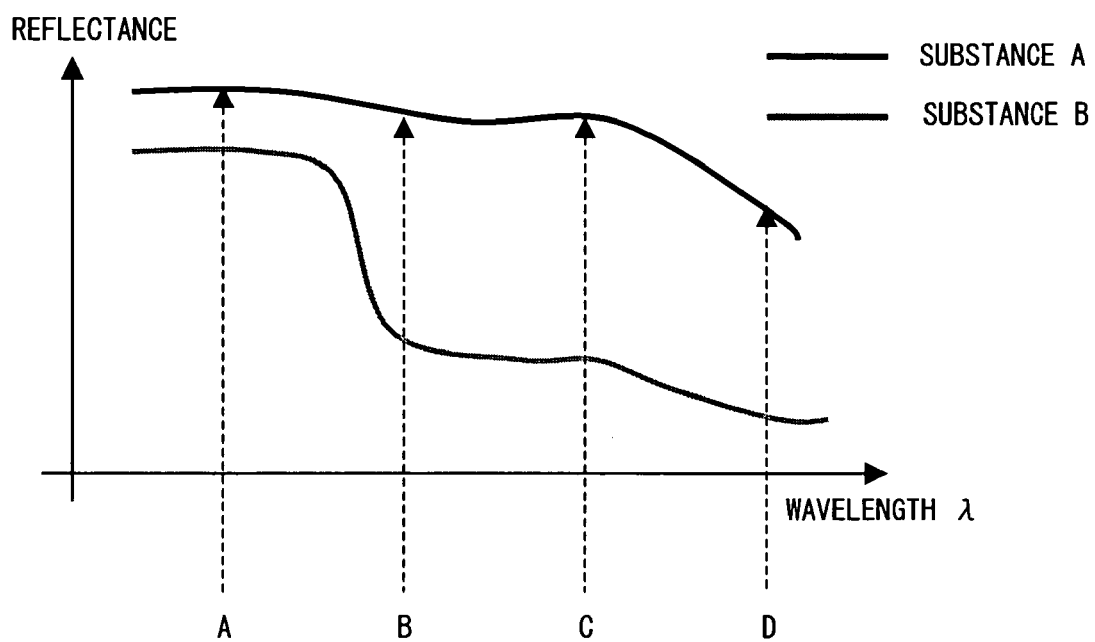
FIG. 1 shows the difference in reflectance of light depending on the difference in substance.
Figure 2:
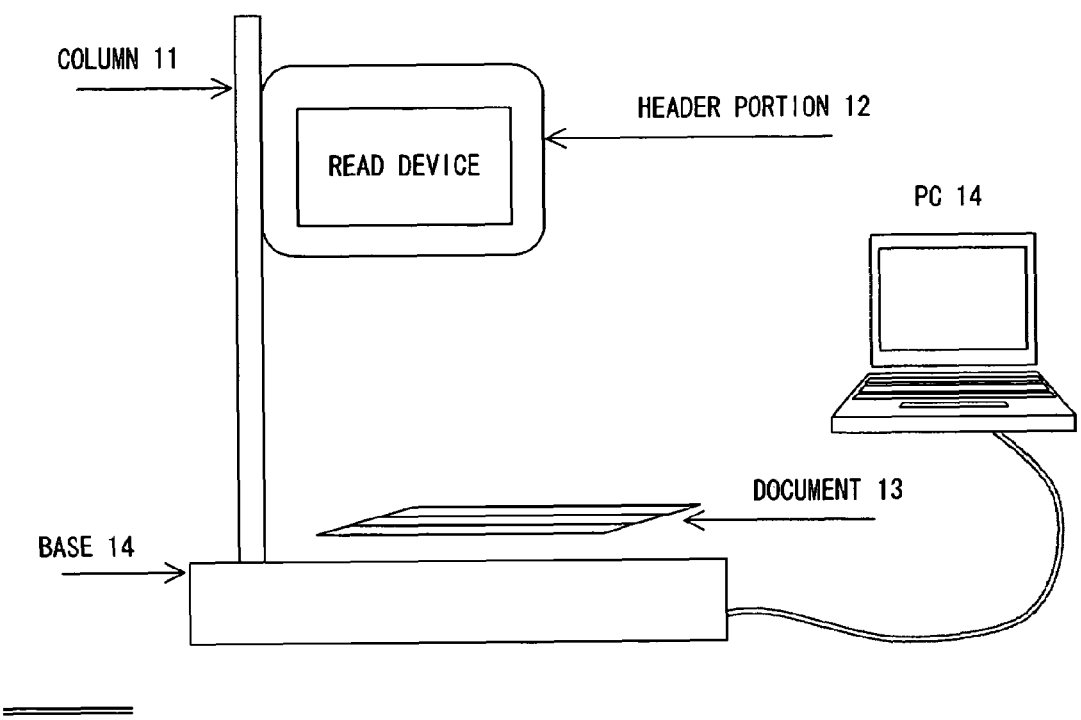
FIG. 2 shows the outline of a conventional non-contact image capture apparatus.
Figure 3:
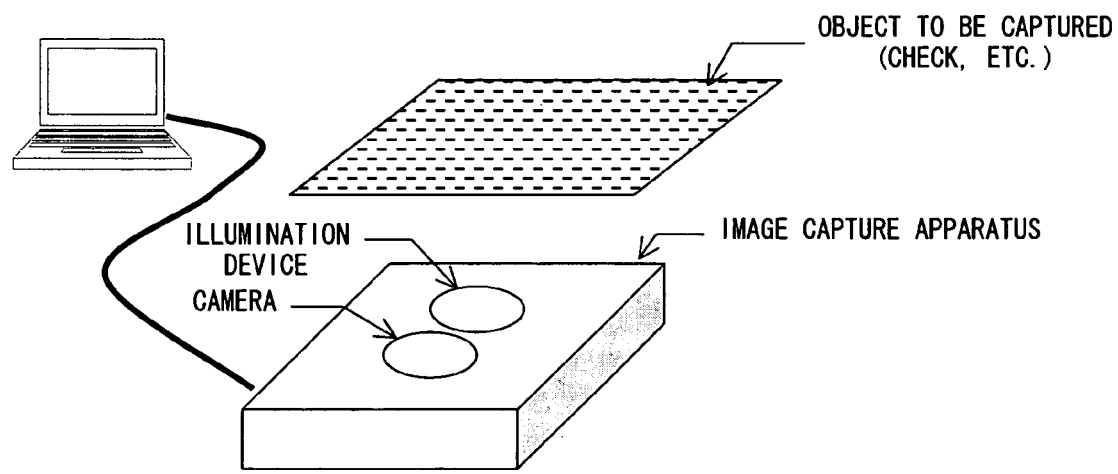
FIG. 3 is an explanatory view showing the appearance of the image capture apparatus according to an embodiment of the present invention.

FIG. 3 shows the appearance of the image capture apparatus according to an embodiment of the present invention.

An image capture apparatus for capturing an image of an object using a plurality of wavelengths is mounted, and a method of capturing a target object by holding the object up above the image capture apparatus is used. With the configuration, it is not necessary to provide a base, etc. for holding the target object, thereby realizing a small and lightweight apparatus. Furthermore, since an image can be captured only by holding an object to be captured up above the apparatus, the image can be quickly captured and determined (for authentication of a slip, etc.).

FIG. 4 is an explanatory view showing a falsification avoiding capability using a material determining capability according to an embodiment of the present invention.

In the case A shown in FIG. 4, the wavelength characteristic of the entire target object can be determined. In the case B, the material is determined by attaching a material known to the wavelength characteristic at a portion of a target object to be determined. Thus, the falsification can be avoided.

To determine the material of an object to be captured from the image of a plurality of wavelengths, the image capture apparatus according to the present invention is provided with a material determination unit.

FIGS. 5A and 5B are explanatory views showing two methods of capturing an image of a plurality of wavelengths.

FIG. 5A shows the configuration of providing illumination for emitting light having different wavelengths. The configuration is simple and inexpensive. Especially, using inexpensive LEDs as illumination devices, the total cost can be reduced.

However, in FIG. 5A, since an image is captured by holding an object to be captured up above the apparatus, the target object can be moved while the wavelengths of the illuminating light are switched. Therefore, the problem of the displacement of a plurality of wavelengths occurs among resultant images.

FIG. 5B shows the configuration of capturing the reflected light having a specific filter when an image is captured by a camera using illumination emitting light having continuous wavelengths. Since this configuration requires a filter for the camera, the structure is complicated and costly. However, since images of a plurality of different wavelengths can be simultaneously captured in FIG. 5B, there is the merit of solving the problem that a target object is moved while switching the illumination wavelengths (as a result, no displacements occur among images of a plurality of wavelengths).

Which configuration shown in FIG. 5A or configuration shown in FIG. 5B is better, depends on the price and the expected traveling velocity of a target object. Therefore, the optimum method is selected depending on the actual application scene.

The image capture apparatus according to the present invention also comprises a determination target object information holding unit for holding the information about an object to be captured. The determination target object information holding unit holds, for example, the information about an object to be captured such as a bill, a check, etc. Practically, it holds (1) an image of an object to be captured, and (2) wavelength characteristic information for determination of a material of an object.

When the present invention is used as a device for reading a bill and a check, a determination is made as to what the object being captured is and whether or not it has been authenticated by two methods of (1) comparing a recorded image with an image being captured, and comparing the material of the recorded object with the material of the object being captured. The determination target object information holding unit holds the information for the comparison.

The image capture apparatus according to the present invention also comprises a matching process unit. The matching process unit compares the marks and numbers on a bill, the signature to a check, etc. so that it can be determined whether or not the image being captured has been recorded or authenticated.

For example, by comparing the marks and numbers, the type of bill can be determined. Furthermore, a signature to a check is recorded in advance so that it can be compared with the signature of the user for authentication.

Refer to the following document for details of the matching process.

"Image Analysis Handbook" p707~p746
Tokyo University Publisher
ISBN 4-13-061107-0
Jan. 17, 1991 published as First Edition With the above-mentioned configuration, the type of bill can be read only by holding the bill up above the image capture apparatus, and the apparatus can also function as an apparatus for determining a counterfeit bill, and an apparatus for authentication of a check.

FIG. 6 shows the problem of the case in which light of different wavelengths are emitted to an object to be captured.

In the embodiment of the present invention, the material is determined according to the characteristic of the reflectance of a captured object when illumination wavelengths are switched. However, the intensity of the light emitted by an illumination device is distributed depending on the wavelength such as a wavelength λ1, a wavelength λ2, etc. Especially, as shown in FIG. 5(*a*), the tendency is apparent when a plurality of illumination devices for emitting different wavelengths are mounted to switch wavelengths. As a result, the illumination intensity is different between the wavelength λ1 and the wavelength λ2 in the same position (point P (x, y) shown in FIG. 6). In this situation, the material cannot be determined based on the wavelength characteristic.

Figure 7A:
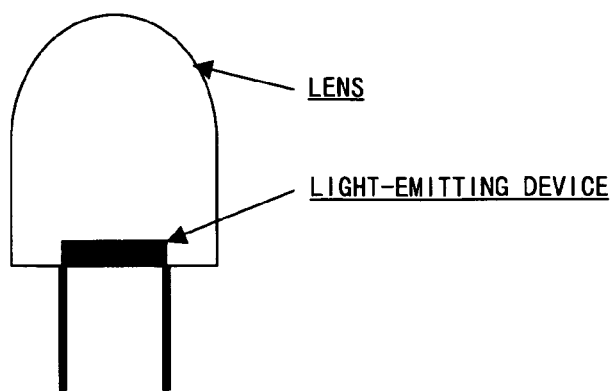
FIGS. 7A through 7C are explanatory views showing the reason for different illumination intensity depending on the wavelength.
Figure 7B:
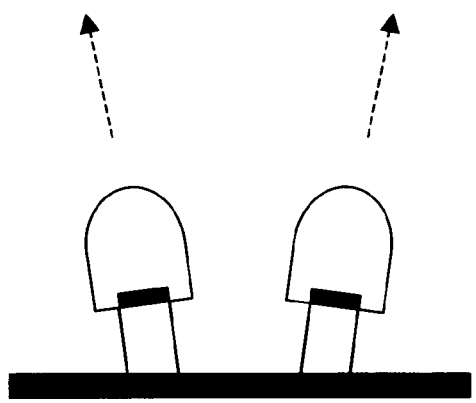
Figure 7C:
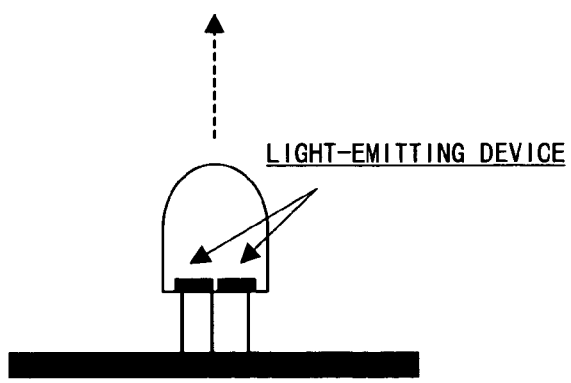

FIGS. 7A through 7C show the reason for different illumination intensity depending on the wavelength.

Described below is one of the reasons for different illumination intensity depending on the wavelength, That is, when a plurality of wavelengths are switched by an illumination device as shown in FIG. 5A, illumination devices such as LEDs, etc. having different wavelengths are provided. Since the installation position and the installation direction are displaced, there occurs the problem that the illumination intensity of a wavelength depends on the position of the captured object (FIG. 7B).

A method for solving the above-mentioned problem is to provide a plurality of light-emitting devices for one lens. An LED comprises a lens portion and a light-emitting device portion as shown in FIG. 7A. As shown in FIG. 7C, the difference in illumination intensity between wavelengths from a different installation position and a different installation direction can be suppressed by inserting a light-emitting device corresponding to two or more wavelengths in one lens.

Another reason for different illumination intensity depending on the wavelength can be a different electro-energy conversion efficiency, area of a light-emitting device, and refractive index depending on the wavelength, etc. Therefore, it is hard to completely reduce the difference in illumination intensity among a plurality of wavelengths. As a result, the brightness is corrected after a camera performs a capturing operation.

FIG. 8 is an explanatory view showing a method of correcting the difference in brightness depending on the wavelength using a brightness correction table.

At each measurement point, the illumination intensity of each wavelength is measured in advance, and is recorded in a brightness correction table. When an object is practically captured, the brightness is corrected based on the brightness correction table. Thus, the influence of the difference in illumination intensity between wavelengths is reduced, and the material of the object can be correctly determined.

Since the illumination intensity distribution changes depending on the distance from the illumination, a brightness correction table can be provided for a predetermined distance. The distance for a brightness correction table in response to the currently input image is determined using a distance sensor or based on the distance from the result of matching with the recorded image.

The image capture apparatus according to the present invention can comprise a distance sensor for measuring the distance to an object. Based on the output of the distance sensor, the optimum brightness correction table is selected to correct the brightness, thereby correctly determining the material of the object.

Furthermore, using the distance sensor, it is determined whether or not there is an object to be captured. When there is no object to be captured, the illumination is turned off and the operation of capturing an image can be stopped, thus considerably saving the electric power and processor power.

Figure 9:
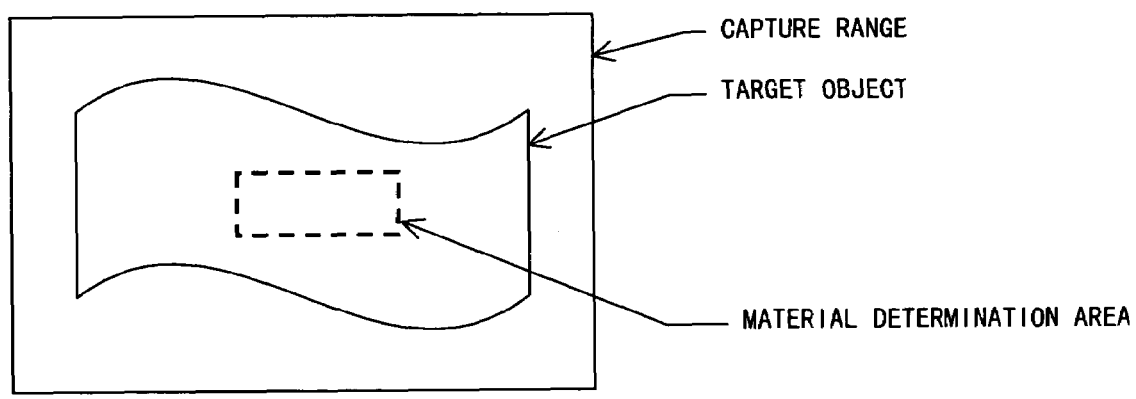
FIG. 9 is an explanatory view (1) of the configuration for determination of a material.
Figure 10:
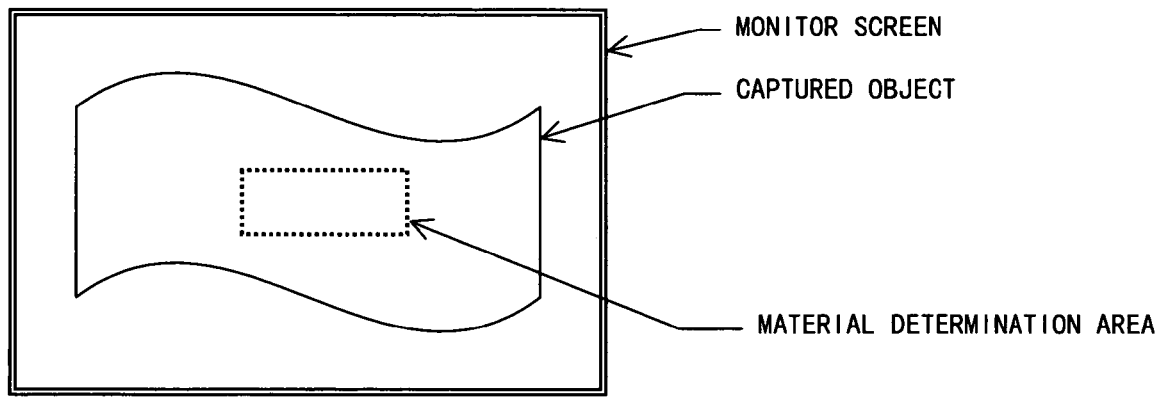
FIG. 10 is an explanatory view (2) of the configuration for determination of a material.

FIGS. 9 and 10 show the configuration of determining the material of an object.

The image capture apparatus according to the present invention determines the material of an object using an image of a plurality of wavelengths. At this time, it is not necessary to perform the material determining process on the entire screen.

For example, by performing the determining process on a small area which reflects a captured object and is extracted from the capture area as shown in FIG. 9, the total arithmetic can be reduced. Furthermore, the material of an object can also be determined by appropriately thinning the pixels in the small area. For example, by determining the material with the pixels thinned at every second pixel, the total arithmetic can be reduced to a quarter.

The material determination area holding unit holds the information about which pixel in which area is used in determining the material of a target object.

The material determination result holding unit also holds the record of determining the material by the material determination unit. When an image matching result is output but the material determination result is different from the recorded material, there can be illegal action such as falsification. If the material determination result which is different from the recorded material of the captured object is output over a predetermined number of times, a process of, for example, giving a warning is performed.

A wavelength of a plurality of wavelengths emitted from the illumination device is selected as the optimum wavelength for the matching with the recorded image in the determination target object information. For example, the pattern of a bill, the signature to a check, etc. are printed or written using ink which can be seen in a visible light area. One of the plurality of wavelengths used in determining the material of an object is processed in a visible light area, and the material is determined with the wavelength combined with the other wavelengths, thereby reducing the number of wavelengths used in the illumination, also reducing the requirements of the buffer and the number of parts of the illumination device, and finally reducing the total cost.

As shown in FIG. 10, the image capture apparatus can be provided with a monitoring capability of displaying an image being captured, a material determination area, etc. The monitoring capability allows the use to check whether or not the material determination area is correctly aligned on the object when the user holds the object to be captured up above the apparatus.

FIG. 11 is an explanatory view showing a method of storing data of an image obtained by emitting different wavelengths.

The illumination can be synchronized with the camera so that the capturing process can be performed using a different wavelength for each capture field of the camera.

When the camera captures an image, the operation can be perform on every second row as shown in FIG. 11 (interlace system). An even-numbered row and an odd-numbered row is respectively referred to as an even field and an odd field.

For example, it is assumed that a target object is captured using 2 wavelengths of λ1 and λ2. First, the target object illuminated using the wavelength λ1. The camera records an image of the wavelength λ1. Upon completion of the capturing operation for the odd fields, the illumination is switched to λ2, and the image is recorded to the even fields. Thus, the image is stored using two wavelengths on one screen, thereby reducing the requirements of the buffer. This operation can be realized because the entire image is not required, but only a part of the information is required in determining the material of an object, and the entire image of the object to be captured is not stored for the determination of the material.

According to the embodiment of the present invention, an image is captured using a wavelength for material determination and using a wavelength for image matching. At this time, using the wavelength for material determination, the information about the entire screen area is not required. Therefore, an image is first captured using a wavelength for material determination, and the image is finally captured using a wavelength for image matching, thereby efficiently using the buffer.

To determine the material of the target object using a plurality of wavelengths, the illumination intensity of the plurality of wavelengths has to be constant. Therefore, a brightness correction table is provided to correct the difference in illumination intensity. The brightness correction table is set at shipment. As described below, a brightness correction table can be newly generated or updated using an input image.

Described below is the method of newly generating a brightness correction table using an input image. First, in the initial state, the brightness correction table is initialized to 0. At this time, since the brightness cannot be corrected, the material cannot be determined.

When an object is presented above the image capture apparatus, a matching process is performed between the recorded image of the object to be determined and the input image without determining the material. As a result, if the similarity between the input image and the object to be determined is higher than a predetermined threshold, then there is the possibility that the input image is a predetermined object to be determined (it is assumed that there is small possibility that an illegally generated object is first presented). Therefore, a brightness correction table is generated such that the brightness of the current input image can match the wavelength characteristic of the predetermined object to be determined. After the brightness correction table is generated, the brightness is corrected and the material is determined based on the table. It is also possible to update the brightness correction table using the input image in the similar method.

Using the image capture apparatus of the present invention, a new brightness correction table can be generated or updated according to the information recorded when an object to be determined is entered.

When a brightness correction table is newly generated according to the information recorded when an object to be determined is entered, the following process is performed. First, the brightness correction table is initialized to 0 in the initial state. At this time, since the brightness cannot be corrected, the material is not determined.

Then, an image of the object to be determined is recorded in the determination target object information holding unit. Since the determination target object information indicates a known object such as a bill, a check, etc., the wavelength characteristic is also known. When the known object is stored in the determination target object information holding unit, a brightness correction table is also generated. Practically, a brightness correction table is generated such that the currently recorded object to be determined can be a known wavelength characteristic. After the brightness correction table is generated, the brightness is corrected and the material is determined according to the table.

A brightness correction table can also be updated according to the determination target object information in the similar method.

Figure 12:
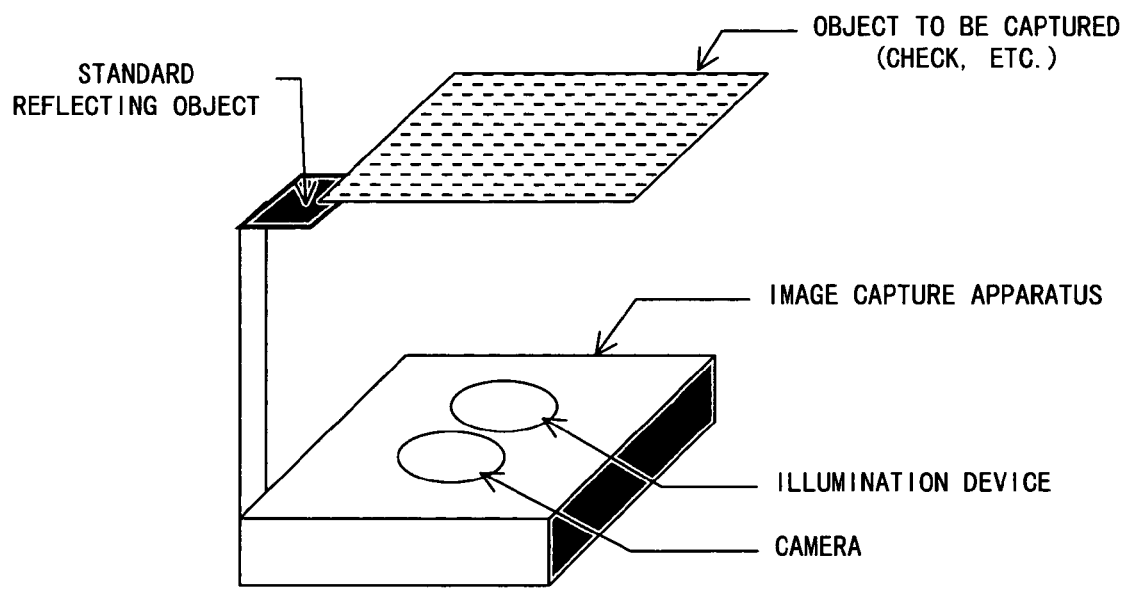
FIG. 12 is an explanatory view showing a method of correcting the brightness using a standard reflecting object.

FIG. 12 is an explanatory view showing a method of correcting the brightness using a standard reflecting object.

The image capture apparatus according to the embodiment of the present invention can be configured such that it can be provided with a standard reflecting object whose wavelength characteristic is known to correct the brightness between wavelengths, and an image can be captured in the capture area.

For example, the configuration is prepared as shown in FIG. 12. A standard reflecting object whose wavelength characteristic is known is set above the camera. When an object to be captured is presented above the apparatus, an image is captured with the standard reflecting object partly overlapping the object to be captured. Then, the camera can simultaneously capture the object to be captured and the standard reflecting object. Since the wavelength characteristic of the standard reflecting object is known, the image capture apparatus can correct the brightness of the image of a plurality of wavelengths used in the capturing process based on the brightness of the standard reflecting object.

As another configuration of the image capture apparatus of the present invention, the object to be captured can include a standard reflecting object whose wavelength characteristic is known. For example, when a bill, etc. is presented above the apparatus, a user wears a wrist band into which a standard reflecting object is incorporated. Otherwise, a standard reflecting object is embedded in the holder of a bill.

Figure 13:
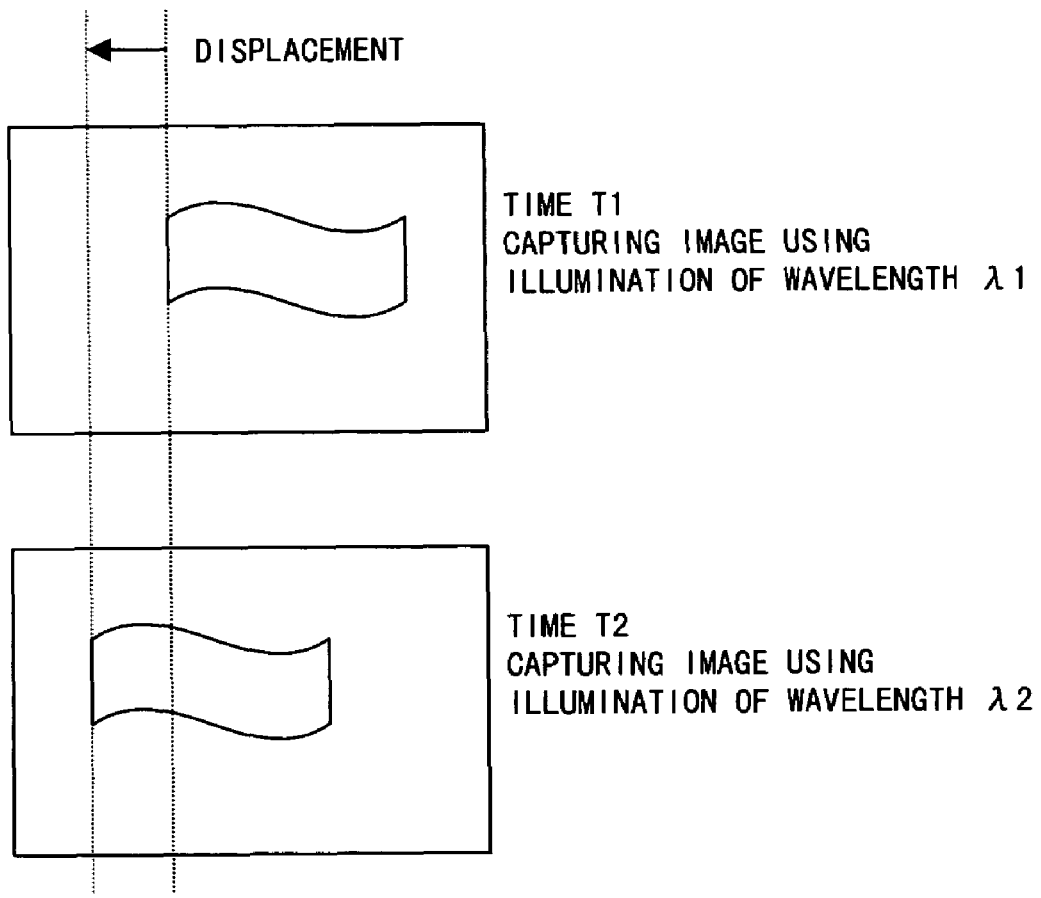
FIG. 13 is an explanatory view of a method of correcting the displacement of an object to be captured.

FIG. 13 is an explanatory view showing a method for solving the problem of the displacement of an object to be captured.

As described above, when the image capture apparatus is configured as shown in FIG. 5A, the wavelengths of the light emitted from the illumination device are switched. Therefore, a time lag occurs in the capturing operation. Therefore, as shown in FIG. 13, the position of the target object can be displaced while an image is captured using each wavelength.

To correct the displacement between the images, an image matching is performed while converting images by a parallel displacement, a rotation, etc. so that the acceptable match result can be obtained between the images. After the positioning, the wavelength characteristic is checked and the material is determined.

The image capture apparatus can also be provided with a network communications capability. With the network capability, the cooperation with other image capture apparatuses, a remote operation, and a remote monitor can be realized.

With the network communications capability, determination target object information can be recorded in one image capture apparatus, and the record can be entered in all other image capture apparatuses.

When the information about the determination target object information is updated over a network, the determination target object information is encrypted and transmitted, and received and decrypted before entry to prevent an illegal entry or the leak of the information.

The apparatus can also be provided with the function of transmitting a message to another image capture apparatus over a network. For example, if the use of a counterfeit bill is detected as a result of determining the material of an object, then the information is transmitted to another image capture apparatus, and a message "to suspend the use of the corresponding bill" can be transmitted.

The apparatus can also comprise an external storage medium access unit for reading data from an external storage medium such as an IC card, etc. By recording the determination target object information using the external storage medium, a new object to be determined can be easily recorded. For example, when the apparatus is used as a counterfeit bill determination device, a new type of bill, etc. can be quickly detected.

In addition to the camera for capturing a target object, another camera for capturing an image of the environment can be provided to store the images at predetermined time intervals. Thus, when a counterfeit bill, check, etc. is detected, a person who has used it can be captured. The captured image is distributed over a network to prevent the repeated illegal use by the same person. With the configuration according to the embodiment of the present invention, the processes of (1) matching images between a captured object and determination target object information recorded in advance, and (2) determining the material of an object can be performed. Therefore, the determination as to whether or not the bill, the check, etc. has been authenticated can be checked from the two aspects, that is, an image matching process, and a material determining process. As a result, a more correct determination can be made.

According to the embodiment of the present invention, a brightness correction table is prepared so that an object to be captured (bill, check, etc.) can be captured and the material of the object can be determined with the object presented above the apparatus without setting the object to be captured on the base, etc. As a result, since no base, etc. is required to place a target object on, the apparatus can be compact and lightweight. Furthermore, since a target object is only to be presented above the image capture apparatus, the image of the object can be quickly captured, and it is an effective device for use in a shop when reading a bill and a check.

The difference in illumination intensity between wavelengths depending on the installation position and installation direction of an illumination device can be removed by providing a plurality of light-emitting devices in a lens of one illumination device such as an LED, etc. As a result, the material of an object can be more correctly determined.

The image capture apparatus according to the embodiment of the present invention comprises a brightness correction table for use in correcting the difference in illumination intensity depending on the distance from and the position of a camera. Since the material can be determined based on the difference in reflectance between wavelengths, the determination cannot be correctly made if the illumination intensity depends on the distance or position. On the other hand, the image capture apparatus according to the embodiment of the present invention has a brightness correction table to correctly determine the material of an object by correcting the brightness.

Since the distribution of the illumination intensity depends on the distance from illumination, the brightness correction table is provided for each distance. As a result, the material of an object can be more correctly determined by providing a distance sensor for measuring the distance to a target object, selecting the optimum brightness correction table based on the output of the distance sensor, and then correcting the brightness.

Furthermore, it is determined using a distance sensor whether or not there is an object to be captured. Therefore, if there is no object to be captured, the illumination can be turned off or the image capturing operation can be stopped, thereby saving electric power and processor power.

When the material of an object is determined based on the wavelength characteristic, the same result can be obtained on the same material when a determination is made in any area. Therefore, it is not necessary to determine the material on the entire captured screen based on the wavelength characteristic. Thus, the material determination area holding unit holds the information about which area and which pixel are used in determining the material of the target object, thereby reducing the total arithmetic much more than in the material determination performed on the entire screen.

The material determination result holding unit holds the record of the material determination performed by the material determination unit. When the determination result states, "The material of the captured object is different from the recorded material", there is the possibility that illegal action has been taken. Therefore, the material determination result holding unit stores a determination result depending on which a warning can be given.

One wavelength of a plurality of wavelengths emitted by an illumination device for material determination can be selected as the optimum wavelength for matching with a recorded image of an object to be determined. As a result, the number of wavelengths for material determination can be reduced with the precision of the image matching maintained. Therefore, the requirements of the buffer in the apparatus, the number of parts of the illumination device, etc. can be reduced, and the total cost can be reduced.

The apparatus has a monitoring capability of displaying an image being captured, a material determination area, etc. With the monitoring capability, the user who holds an object to be captured up above the apparatus can check without fail whether or not the image is being correctly captured, the material determination area correctly overlaps the object, etc.

By capturing an image using different wavelengths in even fields and odd fields of a camera image, the intervals of the time taken to capture images using two wavelengths can be shorter than by capturing an image using a wavelength in one frame. As a result, the displacement between the positions of the captured object between the images using two wavelengths can be smaller. Therefore, the material of the object can be more correctly determined.

A capturing operation is performed for material determination, necessary information only is saved, and then a capturing operation is performed for matching. Thus, the operations can be performed using smaller memory.

Figure 14:
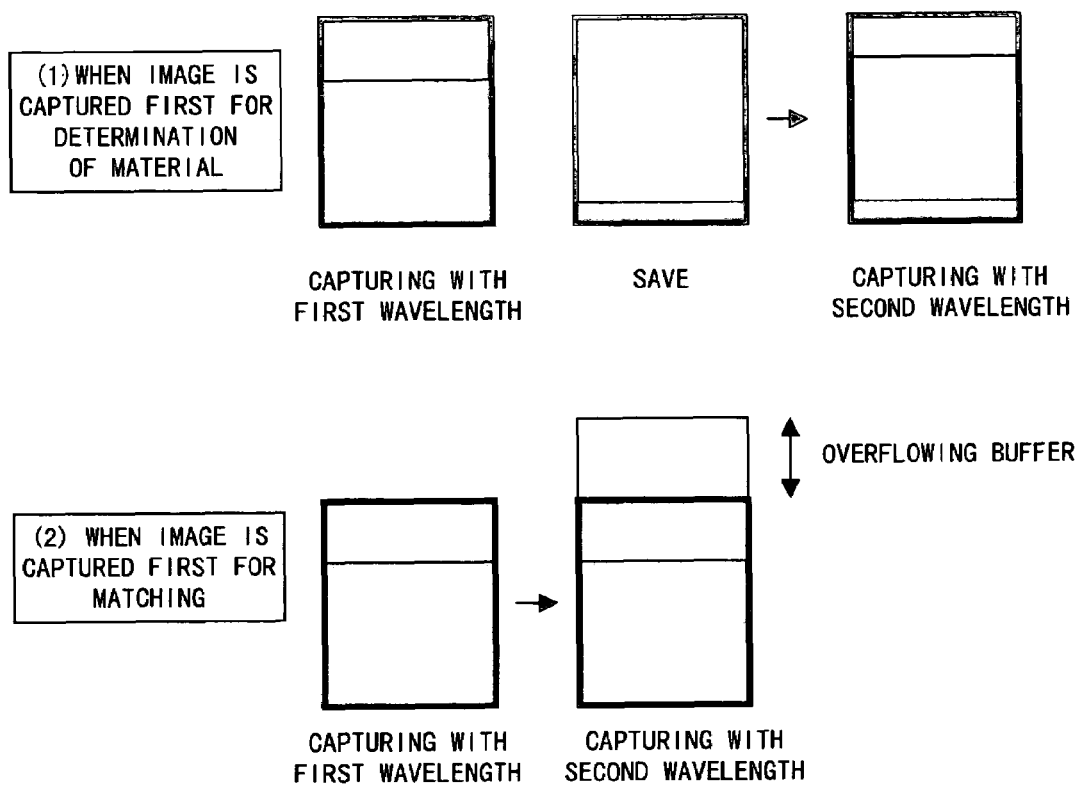
FIG. 14 shows the relationship of the capture order and the memory area between image data for matching and image data for determination of material.

FIG. 14 shows the relationship of the capture order and the memory area between image data for matching and image data for material determination. As shown at the upper portion in FIG. 14, when the capturing operation is performed first for material determination, the image data captured using the first wavelength is stored in the memory which is an image buffer. Then, the image data other than the data required for material determination is discarded or saved for other memory. Next, when an object to be captured is taken using the second wavelength and the image data is stored in the image buffer, the image data captured using the two wavelengths is stored in one image buffer. Since the captured object using the second wavelength is an image for image matching, it is assumed that the entire image data is required. On the other hand, in the case shown in the lower portion in FIG. 14, when the image for image matching is captured using the first wavelength and then the image for material determination is captured using the second wavelength, the former image data required the entire image data and is to be completely stored in the image buffer. Furthermore, if the image data for material determination is obtained using the second wavelength and is to be stored in the image buffer, then the data cannot be completely stored in the image buffer. To extract the image data of the portion only required for material determination from the image data for material determination, it is necessary to temporarily store the entire image data. Therefore, if the image data for image matching is first captured, the excess buffer capacity is required.

A brightness correction table can be predetermined at the shipment from the factory. However, if the table is updated based on an input image, it is not necessary to ensure the correctness of the brightness correction table at the shipment of the factory, thereby reducing the production cost.

Furthermore, in the image capture apparatus according to the embodiment of the present invention, the brightness correction table using an input image can be updated at predetermined time intervals. Thus, the influence of the change with time (attenuation of illumination intensity with time) of an illumination device can be reduced, and the precision of material determination can be maintained at a high level.

By providing a standard reflecting object constantly in a capture area, a brightness correction table can be constantly updated using the standard reflecting object. Therefore, the material of an object can be more correctly determined.

The displacement of the position of an object to be captured between images can be corrected by positioning the image using a plurality of wavelengths through image matching.

By providing a network communications capability, the image capture apparatus according to the present invention can cooperate with another image capture apparatus, and perform a remote operation and monitoring. For example, by remotely monitoring the image capture apparatus and entering determination target object information in one image capture apparatus, the entry can be made in all other image capture apparatuses.

By encrypting and transmitting determination target object information, and receiving and decrypting the information, the leak of the information about the determination target object information, and illegal use of the information can be avoided.

Furthermore, if the use of a counterfeit bill has been detected as a material determination result by providing the function of transmitting a message to other apparatuses over a network, then the information can be announced to other image capture apparatuses, and a message such as "Stop using the corresponding bill" can be transmitted.

Determination target object information can be quickly updated by recording and updating the determination target object information from the external storage medium such as an IC card, etc. For example, when a bill is checked, and when a type of bill not recorded in advance is to be determined, the information is recorded using an IC card, etc., thereby quickly using the bill.

A camera for capturing the environment of the apparatus is provided in addition to the camera for capturing an object to be determined, and captures an image at predetermined time intervals. Thus, when an illegal bill, check, etc. is detected by the material determination, the person who has used it can be captured. Additionally, the image can be distributed over a network so that the same illegal action by the same person can be avoided.

Described below is an example of a configuration of an embodiment of the present invention. In the example of the configuration, a read device for reading a check is exemplified.

Figure 16:
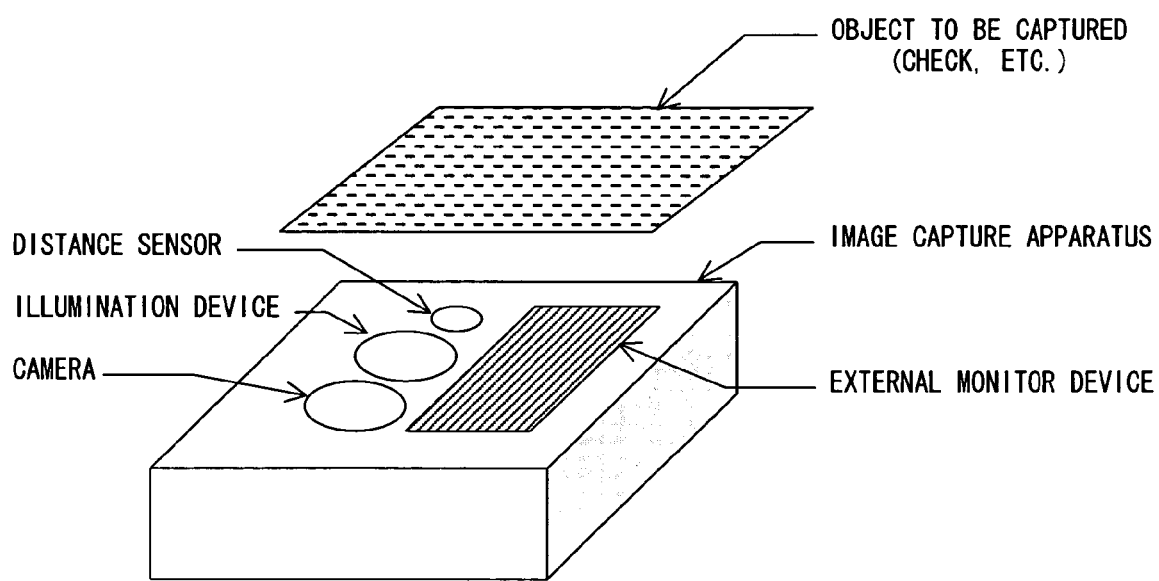
FIG. 16 shows the appearance of the first example of the configuration.

FIG. 15 shows the first example of the configuration according to the embodiment of the present invention. The example of the configuration shows the operation of a simple image capture apparatus. FIG. 16 shows the appearance of the first example of the configuration. In FIG. 16, the image capture apparatus comprises a camera, an illumination device, a distance sensor, and an external monitor. When an object to be captured is presented above the image capture apparatus, the image can be captured.

A general control unit 20 issues an appropriate instruction to each of the units such as an illumination device 22, a camera 23, a matching process unit 26, a determination target object information holding unit 25, etc., and controls the entire apparatus.

A distance sensor 21 is a device for measuring the distance to a target object. For example, it emits infrared, captures the reflected light, and measures the distance.

The illumination device 22 emits light to an object to be captured, and is used in capturing an image for a matching process, and obtaining a wavelength characteristic for material determination.

With the configuration shown in FIG. 5A, a practical illumination device can be provided with LEDs having different peak wavelengths, and also can use LEDs having a plurality of light-emitting devices having different peak wavelengths enclosed in one lens.

With the configuration shown in FIG. 5B, the illumination device 22 emits light having continuous wavelengths. Practically, a halogen lamp, a xenon ark lamp, etc. are used.

Light of a plurality of wavelengths is used in material determination, and one of the plurality of wavelengths is commonly used for image matching. Thus, the number of wavelengths used in material determination can be decreased by 1, thereby reducing the entire cost. Furthermore, since the number of times the camera captures an image can also be decreased, the response time can be improved.

The camera 23 captures an image of a target object of plurality of wavelengths. Practically, the pickup devices such as CMOS, CCD, etc. can be used. With the configuration shown in FIG. 5B, a filter and a pickup device corresponding to the wavelengths for material determination are provided for a camera.

An image buffer 24 is an area for holding an image captured by a camera. The image captured by a camera using a plurality of wavelengths is first stored in the image buffer 24. Then, after correcting the brightness using a brightness correction unit 30, it is used in the image matching by the matching process unit 26 and the determination of wavelength characteristic by a material determination unit 27.

When an image is captured for matching and material determination, images for material determination are first captured, and after saving the necessary number of images, images for matching are captured. Thus, an image buffer can be effectively used.

The determination target object information holding unit 25 stores information about an object which is used in an image matching process or whose material is to be determined. For example, when the image capture apparatus of the present invention is used as a device for identifying a check, a signature is compared with determination target object information to determine the authentication of the check.

To use the apparatus as a counterfeit bill determination device, the design of a bill is recorded. By performing a matching process, it is determined whether or not the bill being captured has been recorded in advance. If the bill being captured matches the bill recorded in advance, then the type of the bill can be determined. By updating the determination target object information, the bill of each type can be identified.

The determination target object information holding unit 25 holds the following practical information.

(1) Image for matching
(2) Wavelength characteristic for material determination

Furthermore, the apparatus can be configured to add the information about a determination target area.

With the configuration of the present invention, an image of the signature to a check is used as a matching image. Furthermore, a counterfeit check can be detected by embedding a material whose wavelength characteristic is known into a part of a check, and performing material determination.

The matching process unit 26 compares an image captured by the camera 23 with the recorded image stored in the determination target object information holding unit 25, and determines whether or not the images match each other. Thus, although an image is deformed when it is presented above the apparatus, a matching process can be correctly performed by image conversion with the object translated or rotated.

Furthermore, a matching result of the matching process unit can be used to correct the displacement between plurality of wavelengths.

The material determination unit 27 determines the material of the captured object according to the brightness information about an image captured using a plurality of wavelengths.

Figure 17:
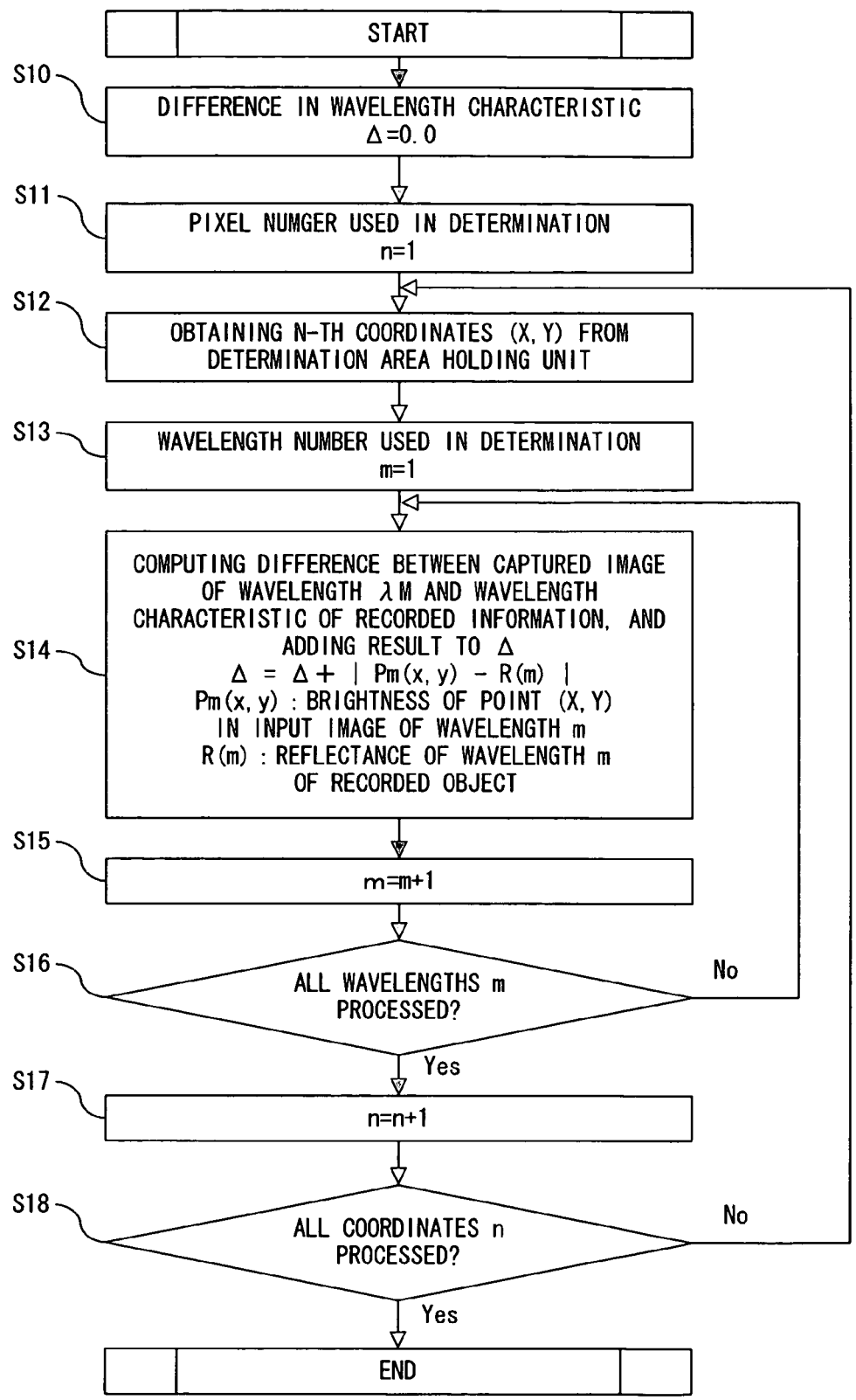
FIG. 17 is a chart of the process contents performed by a material determining process unit.

FIG. 17 is a flowchart of the process performed by the material determining process unit. An image of each wavelength is assumed to have been corrected in advance by the brightness correction unit. That is, if the shapes of the curves of the wavelength characteristic are the same but only the brightness is different between the recorded information and the captured image, then the brightness of the captured image is corrected by the brightness correction unit so that the difference from the wavelength characteristic of the recorded image can be very small.

In FIG. 17, in step S10, the wavelength characteristic difference Δ between the recorded information and the captured image is initialized to 0. In step S11, the pixel number for use in determination is initialized to 1. In step S12, the n-th coordinates (x, y) is obtained from the material determination area holding unit 29. In step S13, the number m of the wavelength for use in material determination is initialized to 1. In step S14, the difference in wavelength characteristic between the captured image having the wavelength λm and the recorded information is calculated, and the result is added to Δ. Practically, when the brightness of the point (x, y) in the input image having the wavelength m is defined as Pm (x, y), and the reflectance of the wavelength m of the recorded object as R (m), the calculation is made by the following equation.

$$\Delta = \Delta + |Pm(x,y) - R(m)|$$

In step S15, m is increased by 1. In step S16, it is determined whether or not the process has been performed on all wavelengths. If the determination result in step S16 is NO, then control is returned to step S14. If the determination result in step S16 is YES, then n is increased by 1 in step S17, and it is determined in step S18 whether or not the process has been performed on all coordinates. If the determination result in step S18 is NO, then control is returned to step S12. If the determination result in step S18 is YES, then the process terminates.

The material determination area holding unit 29 holds the area in the capture screen for use by the material determination unit 27 performing the material determination. Practically, the determination target area is stored in the method in which (1) the position of the point to be determined is sequentially stored, or (2) the coordinates of the center of the determination target area and the length of the side of a determination target area are stored.

When it is determined by the material determination unit 27 that an input image is different in material from a recorded target object, a material determination result holding unit 28 records the information because there can be the possibility of illegal use. The material determination result holding unit 28 holds the information shown in FIG. 18.

FIG. 18 shows an example of the information held by the material determination result holding unit.

No. indicates a serial number of non-matching material detected by the image capture apparatus. The time indicates the time point at which a non-matching material is detected. ID indicates a number uniquely identifying a target object for which a non-matching material is detected. For example, the check of Mr. A is assigned an ID=1058. If the ID is obtained, it is clear which check falls into a non-matching material. If a non-matching result is continuously output with the same ID, then there is the strong possibility of illegal action, and a warning message is displayed on the external monitor device. Although the information held by the material determination result holding unit 28 is stored only when a non-matching material is detected, the information about the case in which a matching material is detected can also be stored as a normal operation log.

The brightness correction unit 30 and a brightness correction table 31 correct the difference in illumination intensity among a plurality of wavelengths. Practically, the brightness correction table has a data structure as shown in FIG. 19A.

Figure 19:
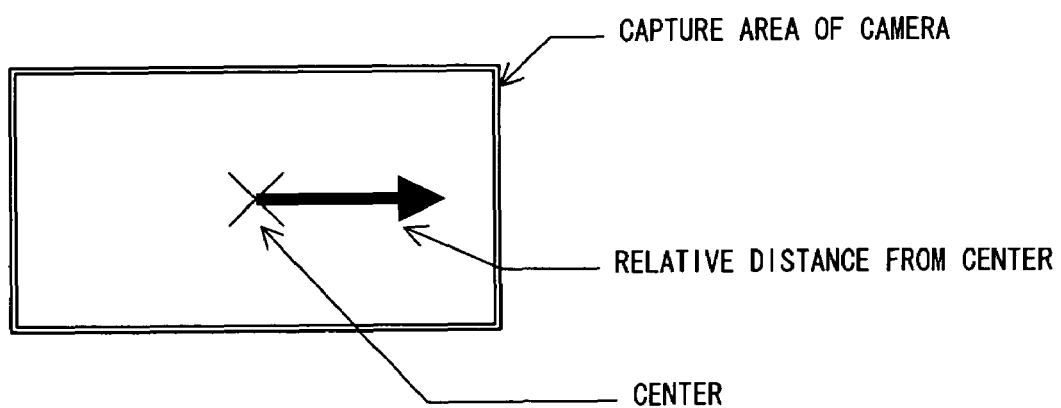
FIGS. 19A and 19B show examples of the data structure of a brightness correction table.

FIGS. 19A and 19B show examples of the data structures of the brightness correction table. The brightness correction table 31 contains the data as shown in FIG. 19A at intervals for each distance of 5 cm, 6 cm, . . . from the camera to the target object. The relative distance L from the center indicates the distance from the center of the screen expressed by the ratio to the length of a capture area as shown in FIG. 19B. Since the illumination intensity changes in circle shape, the same correction coefficient can be used for the same relative distance from the center.

The brightness correction unit 30 measures the distance to a target object according to the output of the distance sensor 21, and selects the appropriate brightness correction table 31 based on the measurement result. If there is no brightness correction table indicating the matching distance to the target object, the brightness correction table 31 indicating the distance similar to the distance to the target object is selected. Otherwise, two tables indicating similar distances are selected, and the brightness correction table 31 can be obtained for the distance from the linear interpolation based on the selected tables.

In the image capture apparatus according to the embodiment of the present invention, the brightness correction table 31 is generated using an input image as described below.

First, in the initial state, the brightness correction table is initialized to 0. First, when an object is presented above the image capture apparatus, the material is not determined, but the matching process is performed using a recorded image. As a result, if the similarity between the input image and the image of an object to be determined is higher than a predetermined threshold, then it is determined that the input image is an object to be determined. The similarity can be obtained by adding up the differences between an input image and recorded information about an object to be determined for each pixel. The brightness correction table 31 is generated such that the brightness of the current input image can match the wavelength characteristic of the wavelength characteristic of an already known object to be determined.

Practically, the following process is performed. That is, assume that the brightness of the point (x, y) of the input image when the illumination wavelength is λm is Pm (x, y). On the other hand, assume that the reflectance of the object to be determined is R(m). Then, the brightness correction coefficient for the point (x, y) can be expressed as follows.

brightness correction coefficient=$R(m)/Pm(x, y)$

The brightness correction table is periodically updated using an input image. It is updated as described above only if an input image is recognized as an already recorded object to be determined as a result of the matching process between the input image and the recorded image and the material determination result. By periodically updating the brightness correction table, the influence of a change in illumination intensity with time can be successfully removed.

The brightness correction unit 30 retrieves from the image buffer 24 an image captured using each wavelength. Using the correction coefficient corresponding to the relative distance from the center of the screen, the brightness of the image is corrected. Practically, the following calculation is performed.

brightness of corrected point (x, y)=brightness of point (x, y) before correction×correction coefficient (x, y)

An external storage medium access unit 32 performs a process of reading data from and writing data to an external storage medium such as an IC card, etc. Since determination target object information recorded in the image capture apparatus can be read from and written to an external storage medium, it is not necessary to perform the recording process on all image capture apparatuses when a new object to be determined is recorded in a plurality of image capture apparatuses, but after the recording process is performed on one image capture apparatus, the same contents can be recorded in other image capture apparatuses using the external storage medium.

An external monitor device 33 has the function of displaying an image currently being executed and a material determination area. An example of the external monitor device 33 is shown in FIG. 10.

By providing the externally monitoring capability, a user can hold an object to be captured above the image capture apparatus while checking that the target object is being correctly captured.

Figure 21:
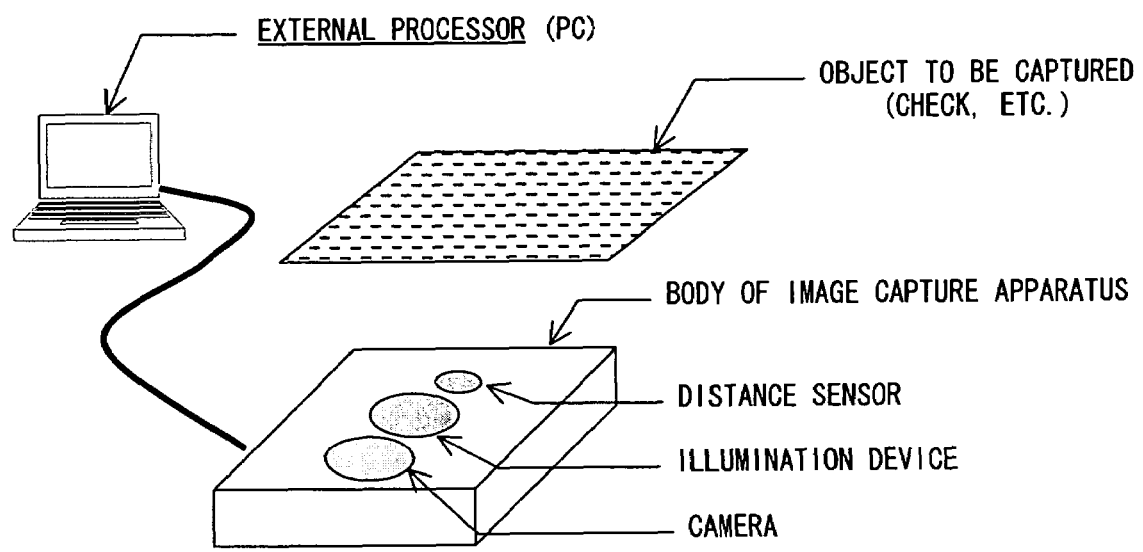
FIG. 21 shows the appearance of the second example of the configuration.

FIG. 20 shows the second example of the image capture apparatus according to the embodiment of the present invention. FIG. 21 shows an appearance of the second example of the configuration.

In the second example of the configuration, an external processor such as a personal computer, etc. is connected to the image capture apparatus. In FIG. 20, the same components shown in FIG. 15 are assigned the same reference numerals, and the explanation is omitted here.

In FIG. 21, the image capture apparatus is provided with a camera, an illumination device, and a distance sensor, and is connected to a PC which is an external processor. The object to be captured is arranged to be presented above the image capture apparatus, and captured.

In the second example of the configuration shown in FIG. 20, the matching process on an image is performed by the external processor 51, and the material determination is performed by an image capture apparatus 50. Since the image matching is a heavy process, it is performed by an external processor 51, and the material determination process which is a light process is performed by the image capture apparatus 50, thereby distributing the load of the processes.

In the second example of the configuration, the matching process and the material determining process is separately performed. Therefore, the determination target object information holding unit is divided into two units. (Refer to 44 and 48 shown in FIG. 20.) A determination target object information holding unit 44 holds a recorded image for performing a matching process. On the other hand, a determination target object information holding unit 48 holds wavelength characteristic information for use in the material determining process.

The brightness correction table 31 is generated according to the first recorded determination target object information. First, in the initial state, a brightness correction table is initialized to 0.

When the determination target object information is first recorded, the brightness correction table is generated such that the brightness of the recorded image can match the wavelength characteristic specific to the object to be determined.

Assume that the brightness of the point (x, y) of the recorded image when the wavelength of illumination is λm is Pm(x,y). On the other hand, assume that the reflectance of the object to be determined is R(m). The brightness correction coefficient for the point (x, y) can be expressed as follows.

brightness correction coefficient=$R(m)/Pm(x, y)$

Furthermore, when the object to be determined is recorded, the brightness correction table 31 is periodically updated using a method similar to the above-mentioned method. By periodically updating the brightness correction table 31, the influence of a change in illumination intensity with time can be removed.

The communications unit 47 allows the image capture apparatus 50 to communicate data with a communications unit 46 of an external processor 51 through a transmission line. An illumination-camera synchronizing circuit 40 synchronizes the capturing operation of the camera with the switching operation of the wavelength of the illumination in capturing an image in the interlace system, and is used to fetch image data obtained using two wavelengths to one piece of image data.

To allow the external processor 51 to perform a heavy matching process, the external processor 51 is provided with a matching process unit 45 in addition to the determination target object information holding unit 44. Furthermore, to store the image data transmitted from the image capture apparatus 50, an image buffer 43 is also provided. Using an external monitor device 42, the user can check whether or not an object to be captured has been correctly arranged. A general control unit 41 of the external processor 51 controls each unit of the external processor 51.

FIG. 22 shows the third embodiment of the configuration of the image capture apparatus according to an embodiment of the present invention.

Figure 23:
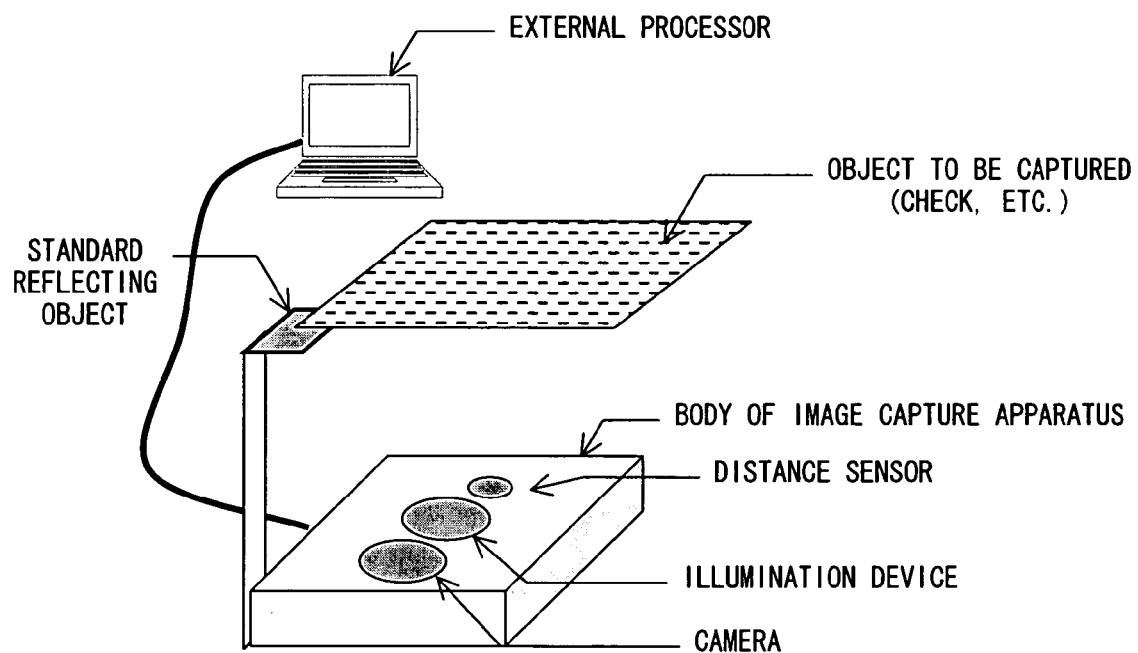
FIG. 23 shows the appearance of the third example of the configuration.

In the third example of the configuration, an external processor such as a personal computer, etc. is connected to the image capture apparatus. FIG. 23 shows the appearance of the apparatus according to the third example of the configuration. In the third example of the configuration, a new standard reflecting object is provided as shown in FIG. 23. In FIG. 22, the same components also shown in FIGS. 15 and 20 are assigned the same reference numerals, and the explanation is omitted here.

In the third example of the configuration shown in FIG. 22, an image matching process and a material determining process are performed by an external processor. Therefore, the determination target object information holding unit 25, the matching process unit 45, the material determination unit 27, the material determination result holding unit 28, the material determination area holding unit 29, the brightness correction unit 30, and the brightness correction table 31 are provided in the external processor 51. Since important processes are performed by the external processor, the entire cost of the image capture apparatus can be successfully reduced.

Data is transmitted from the image capture apparatus 50 to the external processor 51 as follows. First, an entire image for image matching is transmitted to the external processor 51. On the other hand, for an image for material determination, only the image information in the material determination area of the material determination area holding unit 29 is transmitted to the external processor 51. Thus, the amount of information about the communications between the image capture apparatus 50 and the external processor 51 can be reduced, thereby improving the response time. Therefore, the material determination area holding unit 29 is provided for both the image capture apparatus 50 and the external processor 51.

According to the third example of the configuration, a standard reflecting object is prepared for correcting the brightness of a plurality of wavelengths for material determination as shown in FIG. 23. An external processor which receives an image of each wavelength from the image capture apparatus 50 corrects the brightness of an image of each wavelength using the brightness of the standard reflecting object.

Since the standard reflecting object is not provided in front of the capture area, the brightness of the entire capture area can be corrected as follows.

First, assume that the distribution of the illumination intensity in the capture area is known. For example, the portion on which the illumination concentrates is the brightest. The farther from the portion, the lower the illumination intensity. The reduction of the illumination intensity is linearly approximated. Assume that the brightness of the standard reflecting object at the distance of X from the center of the capture area is P. Then, the approximation P(x) of the brightness when the standard reflecting object is positioned at the distance of x from the center of the capture area is expressed as follows.

$$P(x)=P+(X-x)\times\alpha$$

where α is a constant indicating the amount of reduction of the brightness proportional to the distance from the center. α is measured in advance. By applying the equation above to each point on the screen, an approximation of the brightness of the standard reflecting object in the entire capture area can be obtained. As a result, the difference in brightness between wavelengths can be corrected by measuring the wavelength characteristic of the standard reflecting object in advance.

Figure 24:
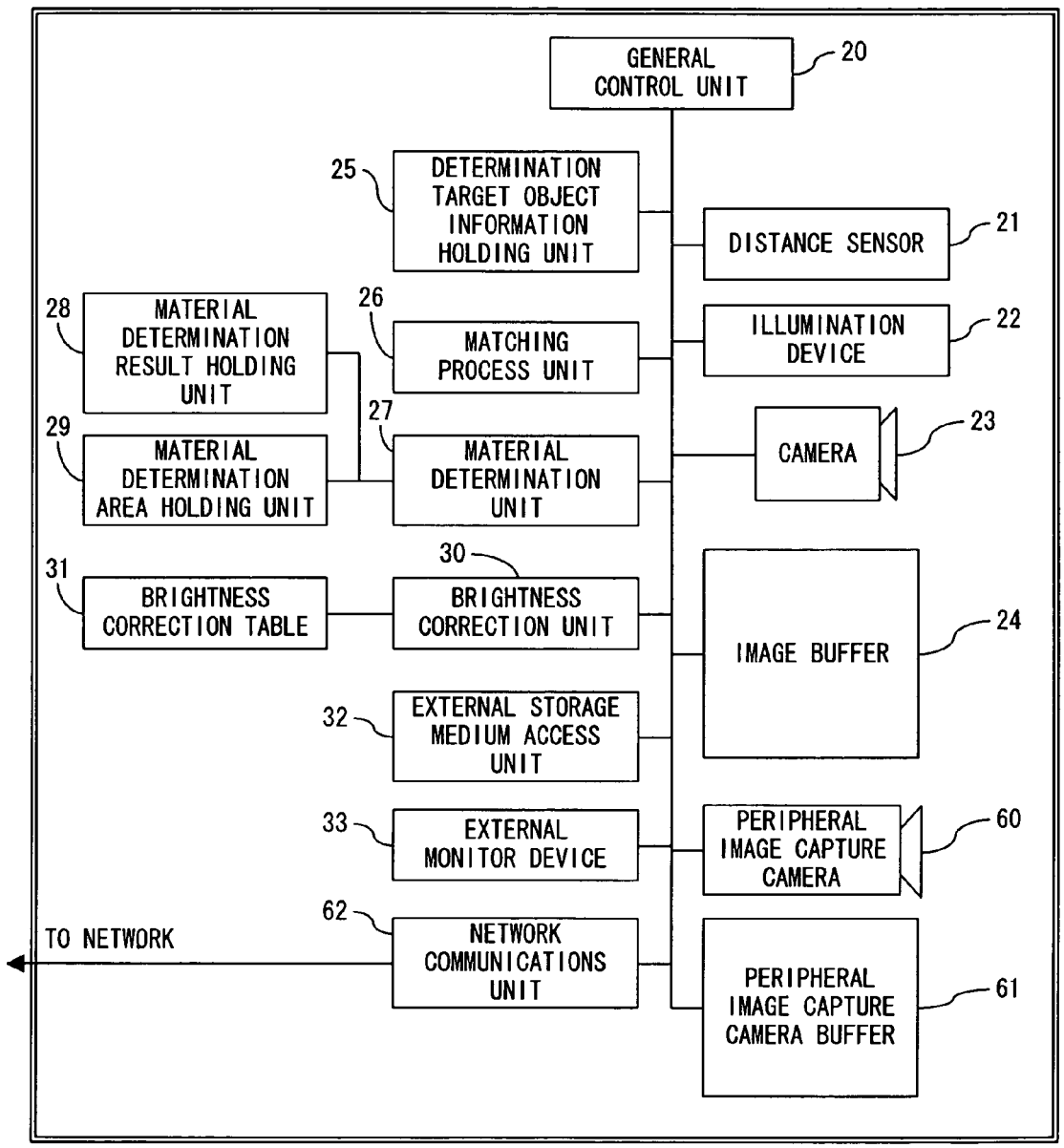
FIG. 24 shows the fourth example of the configuration of the image capture apparatus according to an embodiment of the present invention.

FIG. 24 shows the fourth example of the configuration of the image capture apparatus according to the embodiment of the present invention. FIG. 25 shows the appearance of the fourth embodiment of the configuration. In FIG. 25, the image capture apparatus is provided with a distance sensor, an illumination device, a camera, a peripheral image capture camera, and an external monitor device. The image capture apparatus is connected to a network. In FIG. 24, the components also shown in FIG. 15 are assigned the same reference numerals and the explanation is omitted here.

In the fourth example of the configuration, a single image capture apparatus is operated, and a network capability is prepared. Furthermore, a peripheral image capture camera 60 for monitoring the image around the image capture apparatus is mounted.

The fourth example of the configuration includes a network communications unit 62. By having a network communications capability, the status of the image capture apparatus can be remotely monitored, and by recording determination target object information in one image capture apparatus, it can be recorded in all other image capture apparatuses.

To avoid illegal action over a network, a network communications unit according to the embodiment of the present invention is loaded with an encrypting capability.

Furthermore, the present invention has the function of transmitting a message to other image capture apparatuses over a network, and when the use of a counterfeit check is detected, the information can be transmitted as a warning message to other image capture apparatuses.

In the fourth example of the configuration, the image capture apparatus is provided with the peripheral image capture camera 60 for capturing an image around the apparatus, and an image is captured at predetermined time intervals. The peripheral image capture camera 60 is a wide-angle camera, and can capture a picture of a wide range. The image data captured by the peripheral image capture camera 60 is stored in a peripheral image capture camera buffer 61.

By the peripheral image capture camera monitoring an image around it, a person who uses a counterfeit check can be captured when he or she uses it.

The non-contact image capture apparatus according to the present invention can capture a target object using a plurality of wavelengths. At this time, the displacement between a plurality of wavelengths and the difference in illumination intensity can be corrected. Therefore, the material can be determined from the wavelength characteristic. The image matching process capability can be prepared. As a result, it can be used as a read device having the function of detecting a counterfeit bill and a counterfeit check.

What is claimed is:

1. An image capture apparatus, comprising:
   a camera capturing image data of an object;
   an illumination illuminating the object using a plurality of wavelengths;
   a storage unit storing a recorded image of an object;
   a comparison-determination unit comparing the recorded image with captured image data of the object and determining whether or not the recorded image and the captured image data match each other;
   a material determination unit determining the material of the object from the image data of the object which has been obtained using the plurality of wavelengths; and
   an image buffer storing the captured image,
   wherein the camera captures the image data of the object placed above the camera and the illumination, and
   wherein the image data is captured first for material determination, the image data only required for the material determination is stored in the image buffer, the image date for comparison with the recorded image is captured second, thereby setting memory requirements for the image buffer smaller than an amount of data which can be stored in the image buffer.

2. The apparatus according to claim 1, wherein
   said illumination has a plurality of light sources having intensity peaks of different wavelengths, switches these light sources, and obtains an image of the object to be captured using the plurality of wavelengths.

3. The apparatus according to claim 1, wherein
   said illumination has a light source emitting light of a continuous range of wavelengths, and when the camera captures an image, an image of a specific wavelength is obtained using a filter.

4. The apparatus according to claim 1, further comprising:
   a brightness correction unit correcting a difference in brightness of illumination of light between different wavelengths on the object to be captured.

5. The apparatus according to claim 4, wherein
said brightness correction unit comprises a brightness correction table storing a correction coefficient for correction of brightness.

6. The apparatus according to claim 4, further comprising:
a distance sensor measuring a distance to the object to be captured, wherein
said brightness correction unit comprises a brightness correction table storing a correction coefficient for correction of brightness for each distance to the object to be captured.

7. The apparatus according to claim 1, wherein
material determination is performed on the object to be captured using a part of an image of the object to be captured.

8. The apparatus according to claim 1, wherein
as a result of the material determination, information about a capturing operation in which a different material is detected is stored when the material of the object to be captured is determined to be different from a predetermined material.

9. The apparatus according to claim 1, wherein
an image obtained using one wavelength emitted by the illumination is compared with the recorded image.

10. The apparatus according to claim 1, further comprising:
a monitor unit indicating to a user a state in which the object to be captured is held.

11. The apparatus according to claim 1, wherein
image data are obtained using different wavelengths between an even-numbered row and an odd-numbered row of a scanning line of an image obtained by said camera.

12. The apparatus according to claim 1, further comprising:
a brightness correction unit having a brightness correction table storing a correction coefficient for correction of brightness to correct a difference in brightness of light between different wavelengths emitted to the object to be captured.

13. The apparatus according to claim 12, wherein
said brightness correction table is generated by comparing data obtained when said image capture apparatus performs a first operation with recorded data using the obtained data when similarity is within a predetermined range.

14. The apparatus according to claim 1, wherein
a standard reflecting object is captured together with the object to be captured to correct a difference in brightness of the object to be captured and illuminated by light having different wavelengths.

15. The apparatus according to claim 1, further comprising a network communications function.

16. The apparatus according to claim 15, wherein
The recorded image and wavelength characteristic of the recorded image are recorded in the apparatus connected over a network, or the recorded image and the wavelength characteristic of the recorded image are updated at an instruction from the apparatus.

17. The apparatus according to claim 15, wherein
in network communications, encrypted data are communicated.

18. The apparatus according to claim 1, further comprising:
an external storage medium access unit reading data from an external storage medium, wherein
the recorded image and wavelength characteristic of the recorded image are recorded and updated from the external storage medium.

19. The apparatus according to claim 1, further comprising:
a peripheral image capture camera capturing a state of a surrounding area when the object to be captured is taken.

* * * * *